United States Patent
Yamazaki et al.

(10) Patent No.: US 7,839,124 B2
(45) Date of Patent: Nov. 23, 2010

(54) WIRELESS POWER STORAGE DEVICE COMPRISING BATTERY, SEMICONDUCTOR DEVICE INCLUDING BATTERY, AND METHOD FOR OPERATING THE WIRELESS POWER STORAGE DEVICE

(75) Inventors: Shunpei Yamazaki, Setagaya (JP); Takeshi Osada, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 562 days.

(21) Appl. No.: 11/898,766

(22) Filed: Sep. 14, 2007

(65) Prior Publication Data
US 2008/0079396 A1    Apr. 3, 2008

(30) Foreign Application Priority Data
Sep. 29, 2006    (JP) ............................. 2006-266513

(51) Int. Cl.
*H01M 10/44* (2006.01)
*H01M 10/46* (2006.01)

(52) U.S. Cl. ...................................... 320/134; 320/141

(58) Field of Classification Search ................. 320/107, 320/108, 114, 115, 132, 134, 136, 141, 128; 361/18
See application file for complete search history.

(56) References Cited

U.S. PATENT DOCUMENTS

| | | | |
|---|---|---|---|
| 5,300,875 A | 4/1994 | Tuttle | |
| 6,223,990 B1 | 5/2001 | Kamei | |
| 6,509,217 B1 | 1/2003 | Reddy | |
| 6,737,302 B2 | 5/2004 | Arao | |
| 6,837,438 B1 | 1/2005 | Takasugi et al. | |
| 7,002,265 B2 * | 2/2006 | Potega | 320/134 |
| 7,191,953 B2 | 3/2007 | Wu et al. | |
| 7,333,786 B2 | 2/2008 | Kikuchi et al. | |
| 7,336,270 B2 | 2/2008 | Sato | |
| 2002/0049714 A1 | 4/2002 | Yamazaki et al. | |
| 2004/0128246 A1 | 7/2004 | Takayama et al. | |
| 2004/0145454 A1 | 7/2004 | Powell et al. | |
| 2005/0162131 A1 | 7/2005 | Sennami et al. | |
| 2005/0215119 A1 | 9/2005 | Kaneko | |
| 2005/0254183 A1 | 11/2005 | Ishida et al. | |

(Continued)

FOREIGN PATENT DOCUMENTS

JP    10-307898    11/1998

(Continued)

*Primary Examiner*—Edward Tso
(74) *Attorney, Agent, or Firm*—Eric J. Robinson; Robinson Intellectual Property Law Office, P.C.

(57) ABSTRACT

To simplify charging of a battery in a power storage device which includes the battery. Further, to provide a wireless power storage device which can transmit and receive information without the task of replacing a battery for drive power supply, which becomes necessary when the battery depletes over time, being performed. An antenna circuit, a battery which is electrically connected to the antenna circuit via a rectifier circuit, and a load portion which is electrically connected to the battery are provided. The battery is charged when an electromagnetic wave received by the antenna circuit is input to the battery via the rectifier circuit, and discharged when electrical power which has been charged is supplied to the load portion. The battery is charged cumulatively, and the battery is discharged in pulses.

41 Claims, 22 Drawing Sheets

U.S. PATENT DOCUMENTS

| | | |
|---|---|---|
| 2006/0009251 A1 | 1/2006 | Noda et al. |
| 2007/0229281 A1 | 10/2007 | Shionoiri et al. |
| 2007/0278998 A1* | 12/2007 | Koyama ..................... 320/109 |
| 2008/0210762 A1 | 9/2008 | Osada et al. |
| 2008/0252254 A1* | 10/2008 | Osada ........................ 320/108 |

FOREIGN PATENT DOCUMENTS

| | | |
|---|---|---|
| JP | 2001-067446 | 3/2001 |
| JP | 2003-006592 | 1/2003 |
| JP | 2003-070187 | 3/2003 |
| JP | 2003-299255 | 10/2003 |
| JP | 2003-309490 | 10/2003 |
| JP | 2004-343410 | 12/2004 |
| JP | 2005-150022 | 6/2005 |
| JP | 2005-316724 | 11/2005 |
| JP | 2005-352434 | 12/2005 |
| JP | 2005-354888 A | 12/2005 |
| JP | 2006-004015 | 1/2006 |
| JP | 2006-024087 | 1/2006 |
| JP | 2006-503376 | 1/2006 |
| WO | WO 97/00493 | 1/1997 |

* cited by examiner

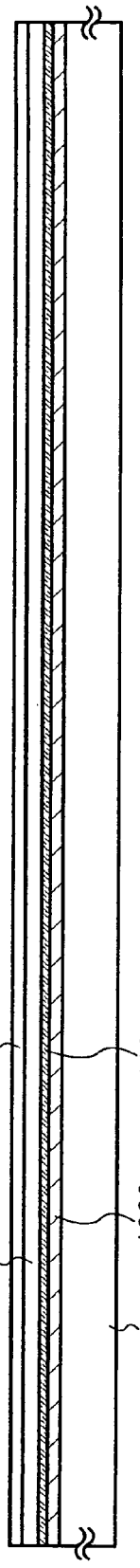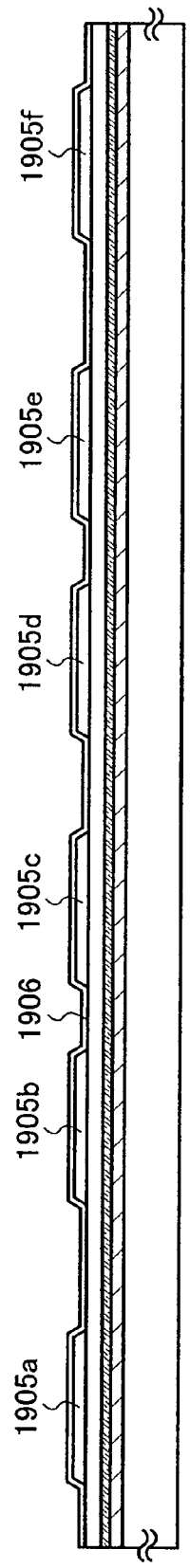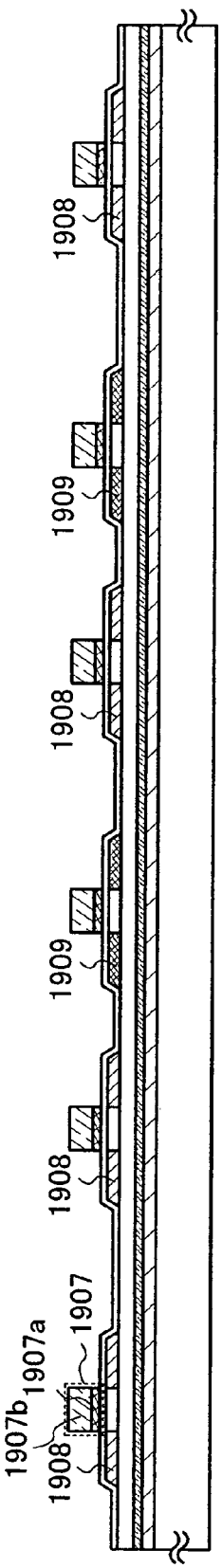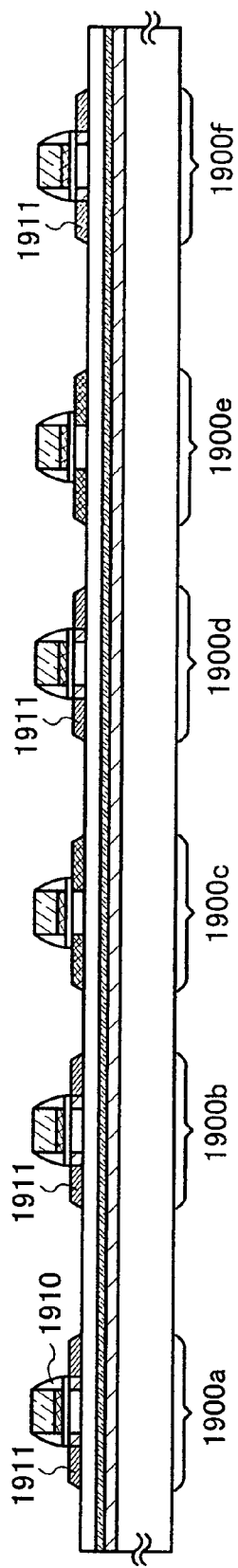

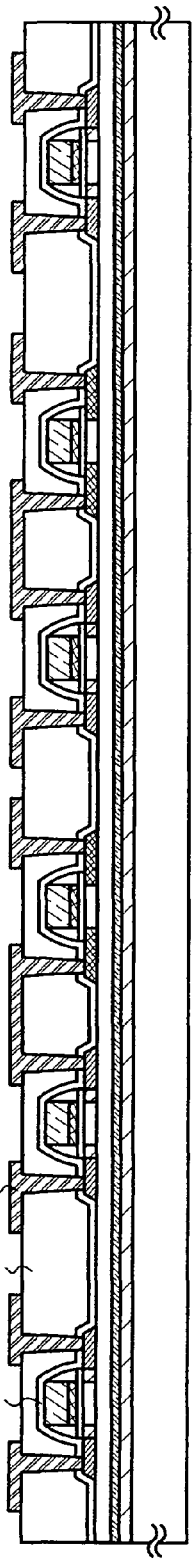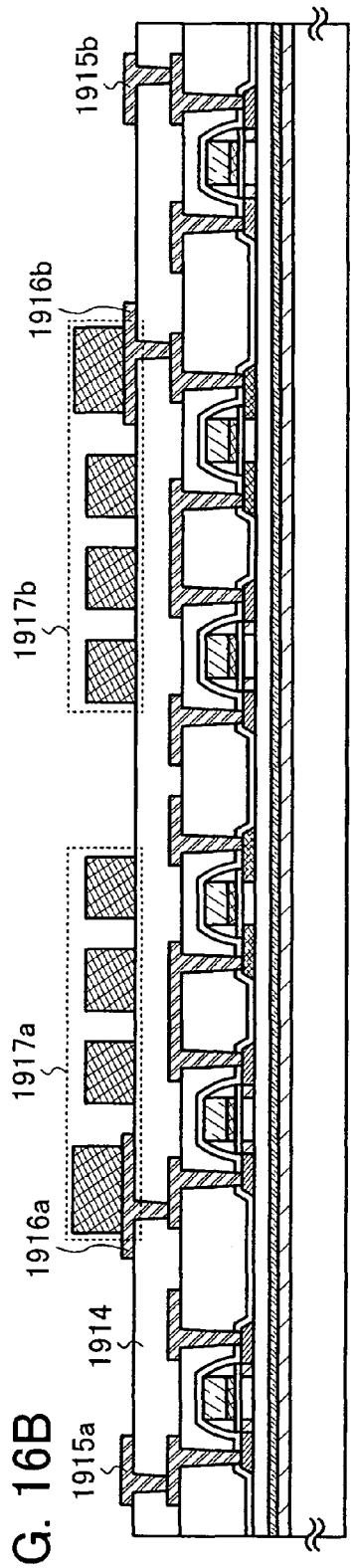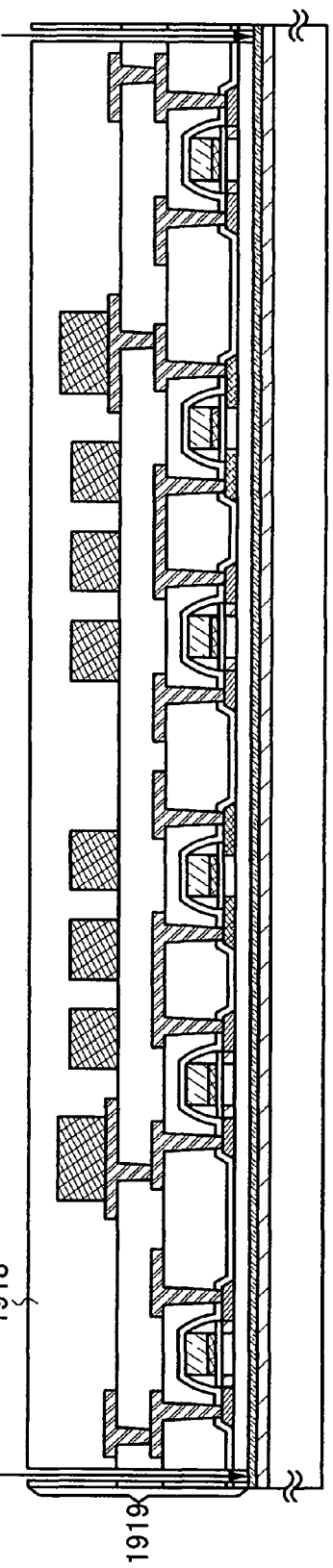

WIRELESS POWER STORAGE DEVICE COMPRISING BATTERY, SEMICONDUCTOR DEVICE INCLUDING BATTERY, AND METHOD FOR OPERATING THE WIRELESS POWER STORAGE DEVICE

BACKGROUND OF THE INVENTION

1. Field of the Invention

The present invention relates to a wireless power storage device and a semiconductor device including the wireless power storage device. In particular, the invention relates to a wireless power storage device which transmits and receives data through electromagnetic waves and receives electrical power through electromagnetic waves, and to a semiconductor device including the same.

2. Description of the Related Art

In recent years, various electric appliances are coming into wide use, and a wide variety of products are being put on the market. In particular, the spread of portable wireless communication devices has been notable. As a power supply for driving a portable wireless communication device, a battery, which is a power receiving means, is built-in, and power is obtained from the battery. As a battery, a secondary cell such as a lithium ion battery or the like is used. As matters now stand, the battery is charged from an AC adaptor which is plugged into a household alternating current power supply, which is a power supply means (for example, see Reference 1: Japanese Published Patent Application No. 2005-150022).

Further, in recent years, individual identification technology which employs wireless communication which uses an electromagnetic field, radio waves, or the like has attracted attention as a mode of usage of wireless communication devices. In particular, an individual identification technology which employs an RFID (radio frequency identification) tag that communicates data via wireless communication, which is an example of a wireless communication device, has attracted attention. An RFID tag is also referred to as an IC (integrated circuit) tag, an IC chip, an RF tag, a wireless tag, and an electronic tag. Individual identification technology which employs RFID tags is beginning to be made use of in production, management, and the like of individual objects, and it is expected that this technology will also be applied to personal authentication, through inclusion in cards or the like.

RFID tags can be divided into two types, according to whether they have a built-in power supply or receive a power supply from outside: active type RFID tags, which can transmit an electromagnetic wave which contains information included in the RFID tag, and passive type RFID tags, which drive by converting an electromagnetic wave (a carrier wave) from outside into electrical power (regarding the active type, see Reference 2: Japanese Published Patent Application No. 2005-316724, and regarding the passive type, see Reference 3: Japanese Translation of PCT International Application No. 2006-503376). Active type RFID tags have a built-in power supply for driving the RFID tag, and include a battery as the power supply. Meanwhile, with passive type RFID tags, a power supply for driving the RFID tag is made by employing electrical power of an electromagnetic wave (a carrier wave) from outside. Passive type RFID tags have a structure which does not include a battery.

SUMMARY OF THE INVENTION

However, the frequency of use of movable electronic devices has risen steadily, and there is a limit to improving the durability of batteries and reducing power consumption in order to cope with the operating time. Further, for charging a battery which is a power supply built into a movable electronic device, there have not been any methods other than charging from a charger through an AC adaptor via a household alternating current power supply or charging from a commercially available primary battery. Therefore, there has been a problem in that charging has been troublesome for users, and it has been necessary for users to take an AC adaptor or a primary battery which is a power supply means with them when they are moving about outdoors, which is burdensome.

In the case of an active type RFID tag which includes a battery for driving, compared with a passive type RFID tag the communication range can be made longer; however, there have been problems such as the fact that the battery is used up over time in accordance with transmission and reception of information and the intensity setting of an electromagnetic wave necessary for transmitting and receiving, and eventually the electrical power necessary for transmitting and receiving the information cannot be generated. Therefore, there has been a problem in that in order to keep using the active type RFID tag which includes the battery for driving, the tasks of checking the remaining capacity of the battery and replacing the battery arise.

Therefore, an object of the present invention is to make charging a battery of a power storage device which includes the battery easier. Further, an object of the invention is to provide a wireless power storage device which can transmit and receive information without the task of replacing a battery for drive power supply, which arises when the battery depletes over time, being performed, and to provide a semiconductor device which includes the wireless power storage device.

In order to solve the above problems, in a wireless power storage device of the invention, an RF battery (a wireless battery) which can be charged wirelessly by receiving an electromagnetic wave is provided. Further, the RF battery is charged over a long period of time, and discharging of electricity is conducted for a shorter period of time (in pulses) than the period of time charging is conducted for. Specific structures of the invention will be described below.

A wireless power storage device of the invention includes an antenna circuit, a battery which is electrically connected to the antenna circuit through a rectifier circuit, and a load portion which is electrically connected to the battery. The battery is charged when an electromagnetic wave received by the antenna circuit is input to the battery through the rectifier circuit, and is discharged when the charged electrical power is supplied to the load portion. The battery is charged cumulatively and the battery is discharged in pulses. A load portion refers to a circuit or the like which uses electrical power of the battery to operate.

A wireless power storage device of the invention includes an antenna circuit, a battery which is electrically connected to the antenna circuit through a rectifier circuit, and a load portion which is electrically connected to the battery. The battery is charged when an electromagnetic wave received by the antenna circuit is input to the battery through the rectifier circuit, and is discharged when the charged electrical power is supplied to the load portion. The period of time that the battery is charged for is longer than the period of time the battery is discharged for.

A wireless power storage device of the invention includes an antenna circuit, a battery which is electrically connected to the antenna circuit through a rectifier circuit and a charge control circuit, and a load portion which is electrically connected to the battery through a discharge control circuit which includes a switch. The battery is charged when an electromagnetic wave received by the antenna circuit is input to the battery through the rectifier circuit and the charge control circuit, and is discharged when the charged electrical power is supplied to the load portion through the discharge control circuit. The battery is charged cumulatively, and is discharged in pulses when the switch turns on in response to a voltage supplied from the battery to the discharge control circuit.

A wireless power storage device of the invention includes an antenna circuit, a battery which is electrically connected to the antenna circuit through a rectifier circuit and a charge control circuit, and a load portion which is electrically connected to the battery through a discharge control circuit which includes a switch. The battery is charged when an electromagnetic wave received by the antenna circuit is input to the battery through the rectifier circuit and the charge control circuit. The battery is discharged when the switch turns on in response to a voltage supplied from the battery to the discharge control circuit and thereby electrical power charged to the battery is supplied to the load portion. The period of time that the battery is charged for is longer than the period of time that the battery is discharged for.

A wireless power storage device of the invention includes an antenna circuit, a battery which is electrically connected to the antenna circuit through a rectifier circuit and a charge control circuit, and a load portion which is electrically connected to the battery through a discharge control circuit which includes a first switch and a switching circuit which includes a second switch. The battery is charged when an electromagnetic wave received by the antenna circuit is input to the battery through the rectifier circuit and the charge control circuit, and is discharged when electrical power which has been charged is supplied to the load portion through the discharge control circuit and the switching circuit. The battery is charged cumulatively. The battery is discharged in pulses when the first switch turns on, in response to a voltage supplied from the battery to the discharge control circuit, and the second switch turns on.

A wireless power storage device of the invention includes an antenna circuit, a battery which is electrically connected to the antenna circuit through a rectifier circuit and a charge control circuit, and a load portion which is electrically connected to the battery through a discharge control circuit which includes a first switch and a switching circuit which includes a second switch. The battery is charged when an electromagnetic wave received by the antenna circuit is input to the battery through the rectifier circuit and the charge control circuit. The battery is discharged when the first switch turns on, in response to a voltage supplied from the battery to the discharge control circuit, and the second switch turns on, so that electrical power which has been charged to the battery is supplied to the load portion. The period of time that the battery is charged for is longer than the period of time that the battery is discharged for.

A wireless power storage device of the invention has an above-described structure, and on and off of the second switch are controlled at a constant frequency.

A wireless power storage device of the invention has an above-described structure, and the amount of electrical power charged to the battery per unit time is less than the amount of electrical power discharged from the battery per unit time.

A semiconductor device of the invention includes an antenna circuit, and a power supply portion and a signal processing circuit which are electrically connected to the antenna circuit. The power supply portion includes a battery, which is electrically connected to the antenna circuit through a rectifier circuit and a charge control circuit, and a discharge control circuit which includes a switch. The signal processing circuit performs communication of information with the outside wirelessly through the antenna circuit. The battery is charged when an electromagnetic wave received by the antenna circuit is input to the battery through the rectifier circuit and the charge control circuit, and is discharged when electrical power which has been charged is supplied to the signal processing circuit. The battery is charged cumulatively. The battery is discharged in pulses when the switch turns on in response to a voltage supplied from the battery to the discharge control circuit.

A semiconductor device of the invention includes a first antenna circuit, a second antenna circuit, a power supply portion which is electrically connected to the first antenna circuit, a signal processing circuit which is electrically connected to the second antenna circuit, and a sensor portion which is connected to the power supply portion and the signal processing circuit. The power supply portion includes a battery, which is electrically connected to the first antenna circuit through a rectifier circuit and a charge control circuit, and a discharge control circuit which includes a switch. The signal processing circuit transmits and receives information to and from the outside wirelessly via the second antenna circuit. The sensor portion is electrically connected with the battery through the discharge control circuit. The battery is charged when an electromagnetic wave received by the first antenna circuit is input to the battery through the rectifier circuit and the charge control circuit. The battery is discharged when electrical power which has been charged is supplied to the sensor portion through the discharge control circuit. The battery is charged cumulatively. The battery is discharged in pulses when the switch turns on in response to a voltage supplied from the battery to the discharge control circuit.

A semiconductor device of the invention has an above structure, and a frequency of an electromagnetic wave that the first antenna circuit receives is different to a frequency of an electromagnetic wave that the second antenna circuit receives.

A semiconductor device of the invention has an above structure, and the amount of electrical power charged to the battery per unit time is less than the amount of electrical power discharged from the battery per unit time.

In the invention, by providing a wireless power storage device with a battery capable of wireless charging, charging of the battery provided in the wireless power storage device is made easier, and a wireless power storage device that is capable of transmitting and receiving information to and from the outside, without the task of replacing the battery due to depletion of the battery over time being performed, can be provided. Further, when the battery is charged over a certain period of time by receiving electromagnetic waves, and stored electrical power is discharged in pulses, a large amount of electrical power can be supplied even when an electromagnetic wave used in charging the battery is weak.

BRIEF DESCRIPTION OF DRAWINGS

FIGS. 15A to 15D show an example of a method of manufacturing a wireless power storage device of the invention.

FIGS. 16A to 16C show an example of a method of manufacturing a wireless power storage device of the invention.

DETAILED DESCRIPTION OF THE INVENTION

Figure 1:
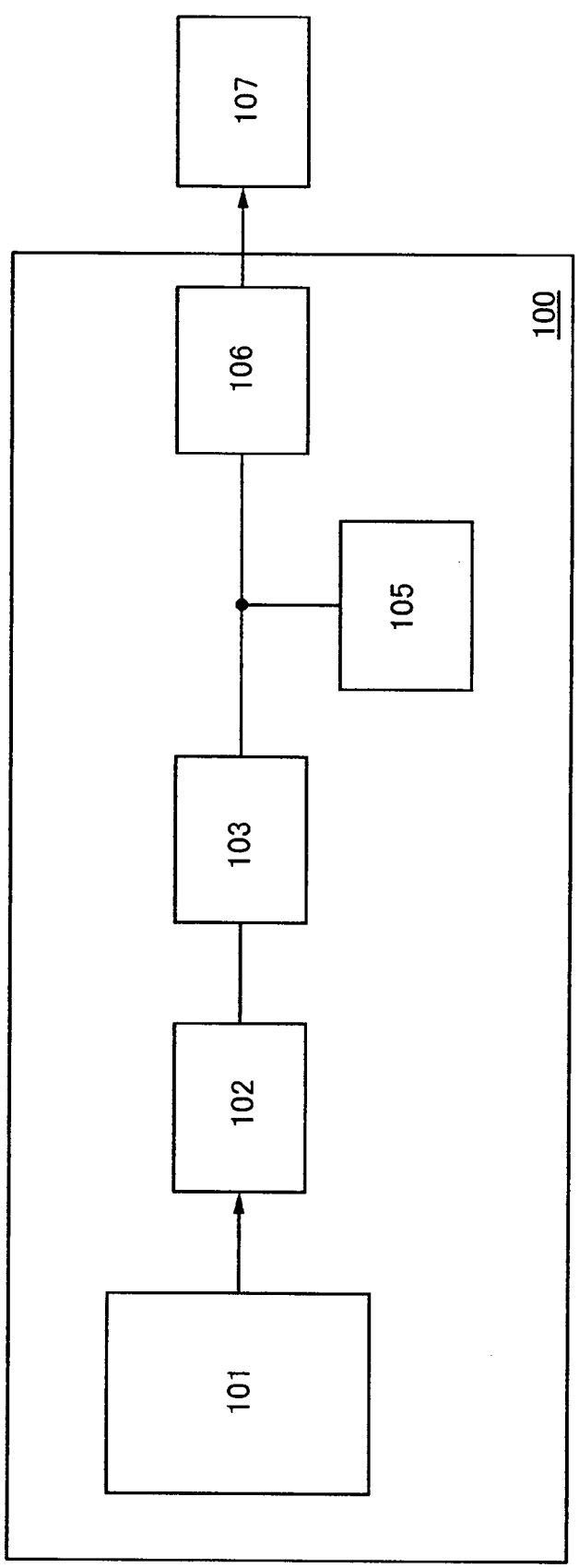
FIG. 1 shows a structural example of a wireless power storage device of the invention.

Hereinafter, embodiment modes of the invention will be described with reference to the accompanying drawings. However, the invention can be implemented in many different forms, and those skilled in the art will readily appreciate that a variety of modifications can be made to the modes and their details without departing from the spirit and scope of the invention. Accordingly, the invention should not be construed as being limited to the description of the embodiment modes. Note that in the structures of the invention which are described below, like reference numerals are used to indicate like parts throughout the drawings.

Embodiment Mode 1

In this embodiment mode, an example of a wireless power storage device of the invention will be described with reference to the drawings.

A wireless power storage device 100 described in this embodiment mode includes an antenna circuit 101, a rectifier circuit 102, a charge control circuit 103, a battery 105, and a discharge control circuit 106 (refer to FIG. 1). In the wireless power storage device 100, the battery 105 is charged when an electromagnetic wave is received by the antenna circuit 101 and the received electromagnetic wave is input to the battery 105 via the rectifier circuit 102. Further, the battery 105 is discharged when electrical power charged to the battery 105 is supplied to a load portion 107. The load portion 107 is provided with a circuit or the like which uses electrical power of the battery 105 to operate. Further, a structure in which the wireless power storage device 100 is provided with the load portion 107 can also be employed. Note that a structure in which one or both of the charge control circuit 103 and the discharge control circuit 106 are not provided may also be employed.

The antenna circuit 101 can include an antenna 451 and a resonant capacitor 452. In this specification, the antenna 451 and the resonant capacitor 452 are collectively referred to as the antenna circuit 101 (refer to FIG. 4A).

The rectifier circuit 102 may be any circuit which converts an alternating current signal, which is induced by an electromagnetic wave that the antenna circuit 101 receives, into a direct current signal. Generally, the rectifier circuit 102 includes a diode and a smoothing capacitor. It may also include a resistor or a capacitor in order to adjust impedance. For example, the rectifier circuit 102 may include a diode 453 and a smoothing capacitor 455, as shown in FIG. 4B.

Figure 5A:
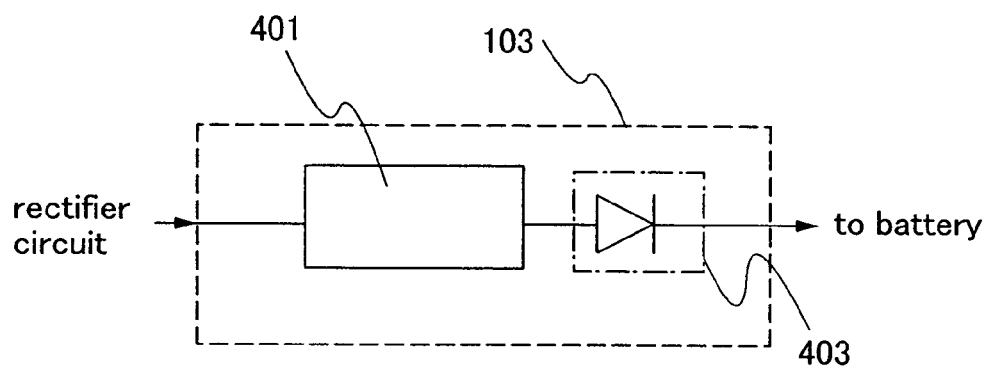
FIGS. 5A and 5B show structural examples of a wireless power storage device of the invention.
Figure 5B:
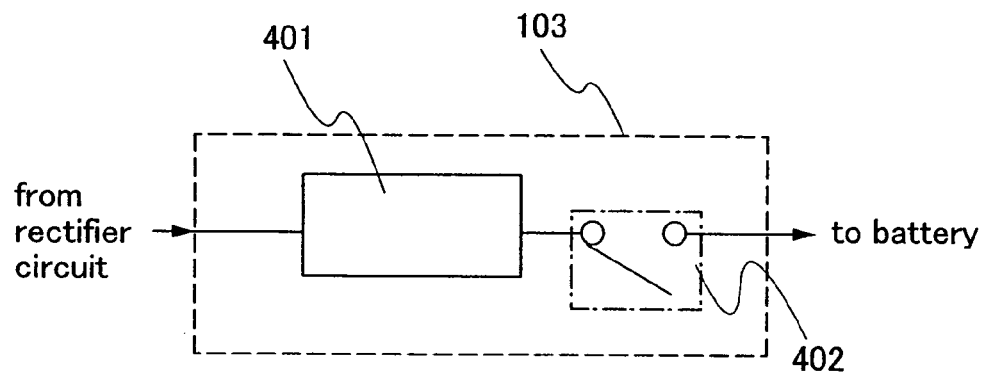

The charge control circuit 103 may be any circuit which controls a voltage level of an electrical signal input from the rectifier circuit 102 and outputs the electrical signal to the battery 105. For example, the charge control circuit 103 can include a regulator 401 which is a circuit that controls voltage, and a diode 403 which has rectifying characteristics, as shown in FIG. 5A. The diode 403 prevents leakage of electrical power that is charged to the battery 105. Therefore, a structure in which the diode 403 is replaced with a switch 402 may be employed, as shown in FIG. 5B. In a case where the switch 402 is provided, by turning the switch on when the battery 105 is being charged and off when the battery 105 is not being charged, leakage of electrical power charged to the battery 105 can be prevented.

The electrical signal whose voltage level is controlled by the charge control circuit 103 is input to the battery 105 and the battery 105 is charged. Electrical power charged to the battery 105 is supplied to the load portion 107 through the discharge control circuit 106 (the battery 105 is discharged).

Figure 7A:
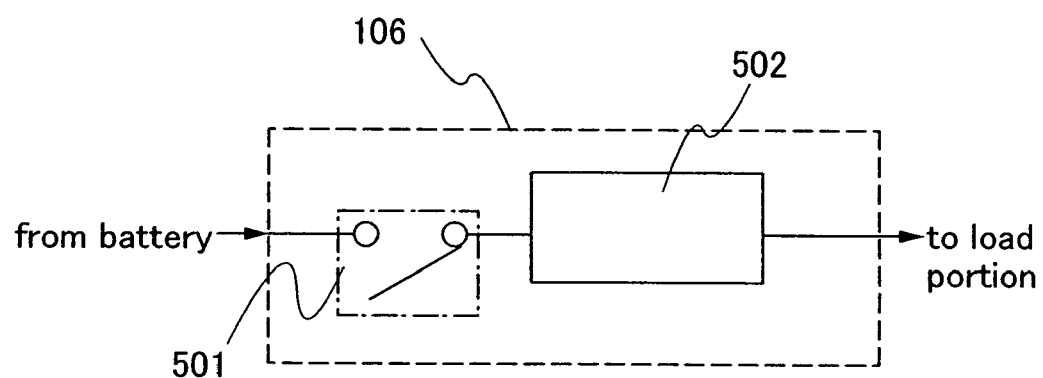
FIGS. 7A and 7B show structural examples of a wireless power storage device of the invention.

The discharge control circuit 106 may be any circuit which controls discharging of the battery 105 by controlling a voltage level output from the battery 105. For example, the discharge control circuit 106 can include a switch 501 and a regulator 502 which is a circuit that controls voltage, as shown in FIG. 7A. By controlling on and off of the switch 501, whether or not electrical power is supplied from the battery 105 to the load portion 107 can be controlled.

Figure 7B:
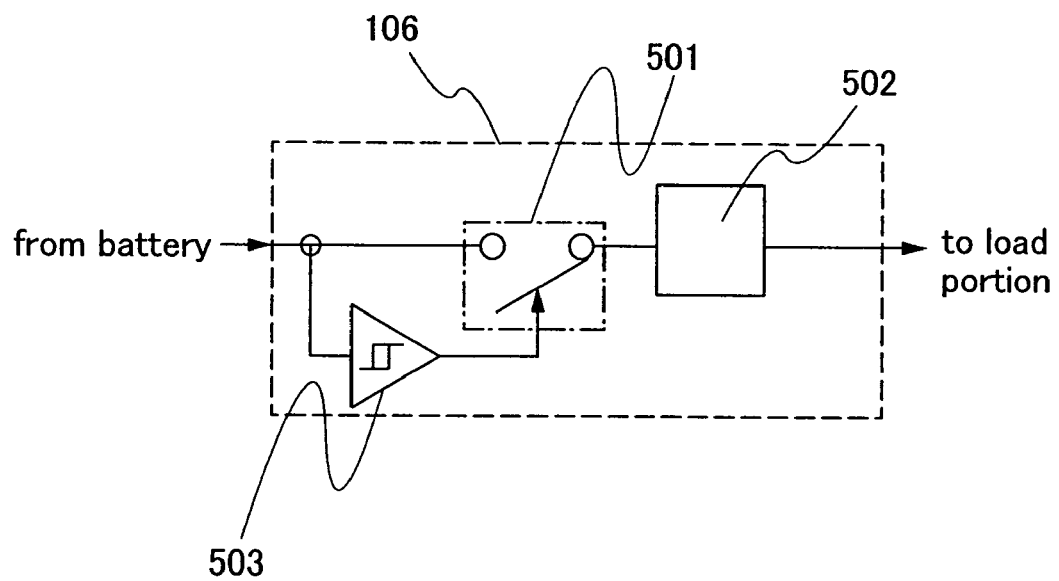

Further, a structure in which on and off of the switch 501 are controlled in accordance with the voltage level of the battery 105 may also be employed. For example, the structure shown in FIG. 7A can include a Schmitt trigger 503 (refer to FIG. 7B). The Schmitt trigger 503 can give hysteresis (a hysteresis characteristic) to a switching element. Specifically, with respect to input voltage, the structure has two threshold levels; an upper limit and a lower limit. On and off can be controlled according to whether input is higher or lower than these limits. For example, a structure in which the switch 501 is turned on when the voltage level of the battery 105 is equal to or greater than 5 V and is turned off when the amount of voltage is equal to or less than 3 V can be employed. In short, a structure in which electrical power is supplied to the load portion 107 only when a certain amount of electrical power is charged to the battery 105 can be employed.

Next, charging and discharging of the battery 105 provided in the wireless power storage device 100 described in this embodiment mode will be described with reference to the drawings.

In the wireless power storage device described in this embodiment mode, the battery 105 is charged cumulatively, and the battery 105 is discharged in pulses. Charging cumulatively refers to charging by taking in electromagnetic waves received by the antenna circuit 101 and adding them together. The invention is not limited to the case where electromagnetic waves are taken in successively, and also includes the case where they are taken in intermittently. Discharging is conducted in pulses refers to when the period of time the battery is discharged (electrical power is supplied to the load portion) for is shorter than the period of time the battery is charged for, and the battery is discharged intermittently.

Figure 3A:
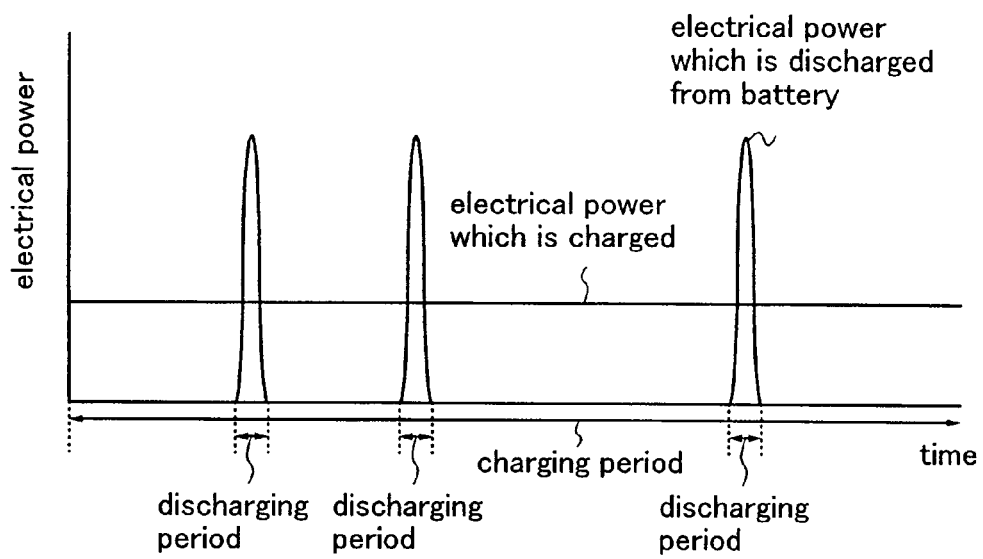
FIGS. 3A and 3B show structural examples of charging and discharging of a wireless power storage device of the invention.

For example, the load portion 107 can be operated by charging the battery 105 little by little, by taking in electromagnetic waves successively over a certain period of time, and supplying the electrical power which has been charged to the battery 105 to the load portion 107 in a short period of time (refer to FIG. 3A).

Taking the wireless power storage device shown in FIG. 1 as an example, using electromagnetic waves taken in over a certain period of time, electrical power is stored in the battery 105 little by little, and when the potential of the battery 105 equals or exceeds a certain level, the switch of the discharge control circuit 106 turns on and a large amount of electrical power is supplied to the load portion 107 in a pulse. Subsequently, electrical power can be supplied continuously to the load portion 107 until the potential of the battery 105 falls below a specified level. When the potential of the battery 105 falls below the specified level, the switch of the discharge control circuit 106 turns off and supply of electrical power from the battery 105 to the load portion 107 is stopped. Then, when the battery 105 is charged and the potential of the battery 105 equals or exceeds the certain level, once again the switch of the discharge control circuit 106 turns on and a large amount of electrical power is supplied to the load portion 107.

When electromagnetic waves are received over a certain period of time and the battery 105 is charged, and the stored electrical power is discharged in pulses, as described above, even when an electromagnetic wave used for charging the battery 105 is weak, a large amount of electrical power can be supplied from the battery 105 to the load portion. In this case, the period of time the battery 105 is charged for is longer than the period of time the battery 105 is discharged for. Further, the amount of electrical power discharged from the battery 105 (the amount of electrical power supplied to the load portion 107) per unit time is larger than the amount of electrical power charged to the battery 105 per unit time. Note that in FIG. 3A, an example is shown in which the antenna circuit 101 successively takes in electromagnetic waves and a given amount of electrical power is charged per unit time; however, the invention is not limited to the case where electromagnetic waves are taken in successively, and the battery 105 may be charged by intermittently taking in pulsed waves or modulated electromagnetic waves.

Note that in a case where electrical power charged to the battery 105 is discharged to the load portion 107 in pulses, a structure may be employed in which a switching circuit is provided between the discharge control circuit 106 and the load portion 107, and the switching circuit turns on at periodic intervals, and thereby electrical power is supplied to the load portion 107 intermittently. For example, a switching circuit 133 can be provided between the discharge control circuit 106 and the load portion 107, and a clock generation circuit 131 and a frequency divider circuit 132 can be used to control on and off of the switch provided in the switching circuit 133 at periodic intervals (at a constant frequency) (refer to FIG. 13). In such a case, electrical power is supplied to the load portion 107 from the battery 105 when the switch provided in the discharge control circuit 106 and the switch provided in the switching circuit 133 are on. Further, a structure in which electrical power necessary for operations of the clock generation circuit 131 and the frequency divider circuit 132 is supplied from the battery 105 can be employed. Note that for the structure shown in FIG. 13, control of the period of time of on and off of the switch provided in the switching circuit 133 and the like can be freely determined by a practitioner of the invention designing the clock generation circuit 131 and the frequency divider circuit 132 as appropriate.

Further, in the case where electrical power charged to the battery 105 is discharged to the load portion 107 in pulses, a structure can be employed in which when the switch provided in the discharge control circuit 106 is in an on state, the load portion 107 operates at periodic intervals and receives electrical power from the battery 105.

In the wireless power storage device described in this embodiment mode, for the electromagnetic waves received by the antenna circuit 101, electromagnetic waves emitted from a power feeder which emits electromagnetic waves at a specified wavelength may be used, and electromagnetic waves generated at random outside may also be used. The power feeder may be any device which emits electromagnetic waves at a specified wavelength, and preferably emits electromagnetic waves having a wavelength such that they are easily received by the antenna provided in the antenna circuit. As electromagnetic waves which are generated at random outside, for example, electromagnetic waves from a mobile telephone relay station (800 to 900 MHz band, 1.5 GHz, 1.9 to 2.1 GHz band, or the like), electromagnetic waves emitted from a mobile telephone, electromagnetic waves from a wave clock (40 kHz or the like), noise from a household alternating current power supply (60 Hz or the like), or the like can be used.

In the case of using a power feeder, a transmission method for electromagnetic waves that is applied between the antenna circuit 101 and the power feeder can be an electromagnetic coupling method, an electromagnetic induction method, a microwave method, or the like. The transmission method may be selected as appropriate by a practitioner of the invention in consideration of an intended use. An antenna with a length and shape which are suitable for the transmission method may be provided.

For example, in a case where an electromagnetic coupling method or an electromagnetic induction method (e.g., 13.56 MHz band) is employed as a transmission method, since electromagnetic induction caused by changes in electric field density is used, a conductive film which serves as an antenna is formed with a circular shape (e.g., a loop antenna) or a spiral shape (e.g., a spiral antenna). Further, in the case of employing a microwave method (e.g., a UHF band (860 to 960 MHz band), a 2.45 GHz band, or the like) as a transmission method, the length and shape of a conductive film which serves as an antenna may be determined as appropriate taking a wavelength of an electromagnetic wave used for signal transmission into consideration. For example, the conductive film which serves as an antenna can be formed with a linear shape (e.g., a dipole antenna), a flat shape (e.g., a patch antenna), or the like. Further, the shape of the conductive film which serves as an antenna is not limited to a linear shape. Taking the wavelength of an electromagnetic wave into consideration, the shape may be a curved shape, a meandering shape, or a combination of these.

Figure 8A:
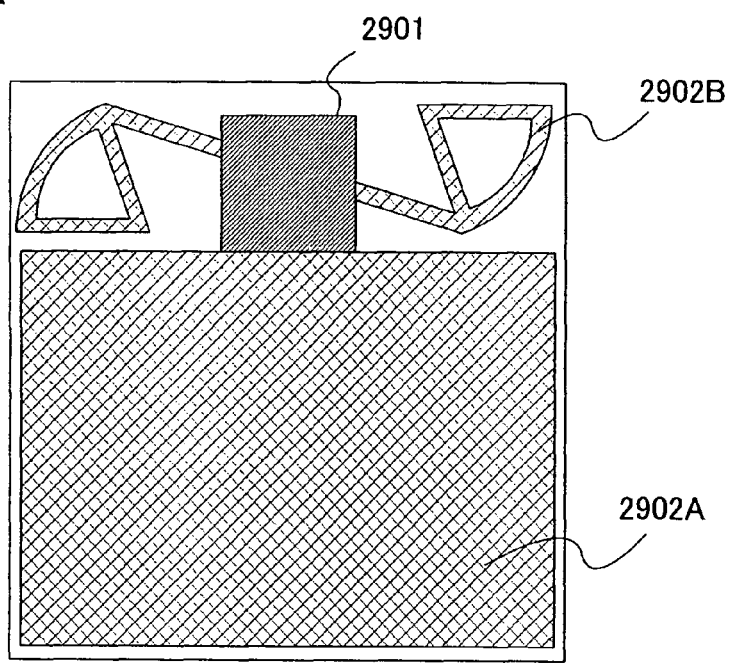
FIGS. 8A and 8B show structural examples of a wireless power storage device of the invention.
Figure 8B:
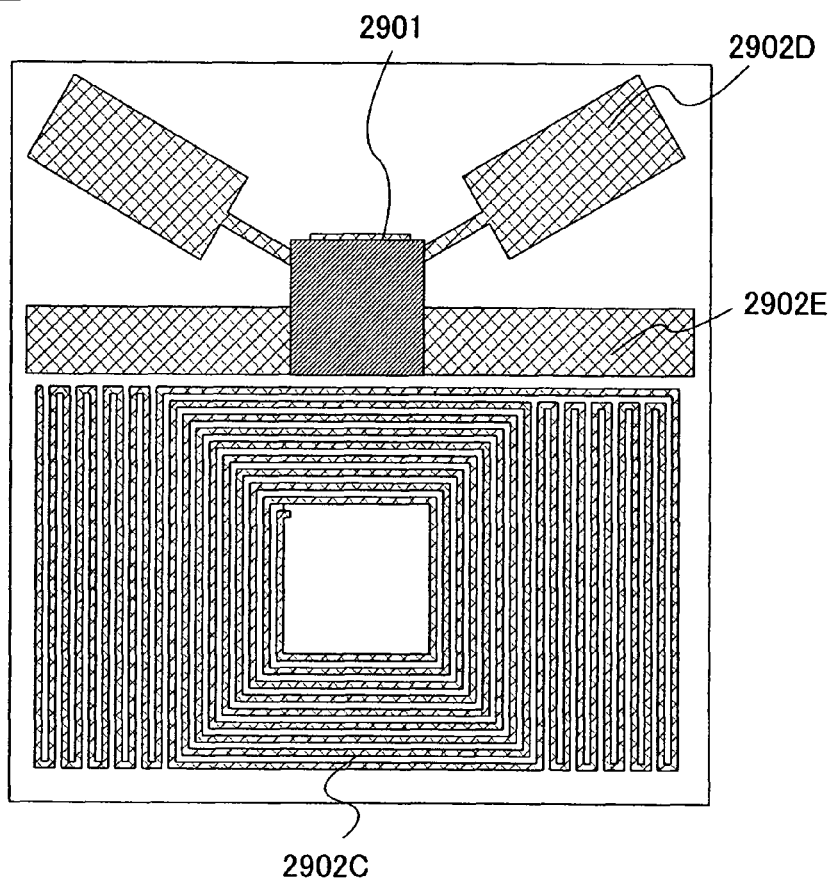

Note that a structure can be employed in which antenna circuits which each include antennas with different shapes are combined, so that electromagnetic waves with different frequency bands can be received. As an example, shapes of antennas provided in antenna circuits in FIGS. 8A and 8B will be described. For example, a structure may be employed in which an antenna 2902A and a 180 degrees omnidirectional (can receive signals equally from any direction) antenna 2902B are disposed around a chip 2901 which is provided with a battery, a load portion, and the like, as shown in FIG. 8A. Alternatively, a structure may be employed in which an antenna 2902C with a thin coiled shape, an antenna 2902D for receiving high-frequency electromagnetic waves, and an antenna 2902E which extends in a long rod shape are disposed around a chip 2901 which is provided with a battery, a load portion, and the like, as shown in FIG. 8B. When an antenna circuit which includes antennas which have different shapes is provided, as shown in FIGS. 8A and 8B, a wireless power storage device which receives electromagnetic waves with different frequency bands (for example, electromagnetic waves from a power feeder and electromagnetic waves generated at random outside) can be formed.

Further, in the case of using a power feeder, there is no particular limitation on the frequency of electromagnetic waves transmitted from the power feeder to the antenna circuit 101, and for example, any of a 300 GHz to 3 THz submillimeter wave, a 30 GHz to 300 GHz millimeter wave, a 3 GHz to 30 GHz microwave, a 300 MHz to 3 GHz ultrahigh frequency wave, a 30 MHz to 300 MHz very high frequency wave, a 3 MHz to 30 MHz high frequency wave, a 300 kHz to 3 MHz medium frequency wave, a 30 kHz to 300 kHz low frequency wave, and a 3 kHz to 30 kHz very low frequency wave can be used.

Further, 'battery' as referred to in this specification means a power storage means whose continuous operating time can be restored by charging. Note that as power storage means, there are a secondary cell, a capacitor, and the like; however, in this specification, these power storage means are referred to under the general term 'battery'. As a battery, although the type of battery used may differ depending on an intended use, preferably a battery formed with a sheet-like shape is used. For example, when a lithium battery is used, preferably a lithium polymer battery that uses a gel electrolyte, a lithium ion battery, or the like, miniaturization is possible. Of course, any battery may be used as long as it is chargeable. A battery that can be charged and that can discharge, such as a nickel metal hydride battery, a nickel cadmium battery, an organic radical battery, a lead-acid battery, an air secondary battery, a nickel-zinc battery, or a silver-zinc battery may be used. A high-capacity capacitor or the like may also be used.

Note that as a capacitor which can be used as a battery in the invention, it is desirable to use a capacitor having electrodes whose opposing areas are large. In particular, it is preferable to use an electric double layer capacitor which employs an electrode material with a large specific surface area such as activated carbon, fullerene, or a carbon nanotube. A capacitor has a simpler structure than a battery, can easily be made thin, and can easily be formed by stacking layers. An electric double layer capacitor is preferable because it has a function of storing electricity, does not deteriorate much even when the number of times it is charged and discharged increases, and can be charged quickly.

Note that in this embodiment mode, electrical power that is stored in the battery is not limited to an electromagnetic wave received by the antenna circuit 101. A structure in which a power generation element is supplementarily provided in a part of the wireless power storage device may also be employed. Employing a structure in which a power generation element is provided in the wireless power storage device is preferable because when such a structure is employed, the amount of electrical power supplied for storage in the battery 105 can be increased and the charging rate can be increased. As a power generation element, a power generation element which employs a solar cell, a power generation element which employs a piezoelectric element, or a power generation element which employs a micro electro mechanical system (a MEMS) may be used, for example.

When a battery which can be charged wirelessly is provided, as described above, a wireless power storage device can be charged easily. Further, when electromagnetic waves are received over a certain period of time and thereby the battery is charged, and the stored electrical power is discharged in pulses, a large amount of electrical power can be supplied from the battery to a load portion even when an electromagnetic wave used for charging the battery is weak. In particular, the wireless power storage device described in this embodiment mode is very effective when the battery is charged by an antenna circuit receiving weak electromagnetic waves which are generated at random outside.

Note that the wireless power storage device described in this embodiment mode can be combined with structures of wireless power storage devices described in other embodiment modes in this specification.

Embodiment Mode 2

In this embodiment mode, a structure which differs from the structure of the wireless power storage device described in the previous embodiment mode will be described with reference to the drawings.

Figure 2:
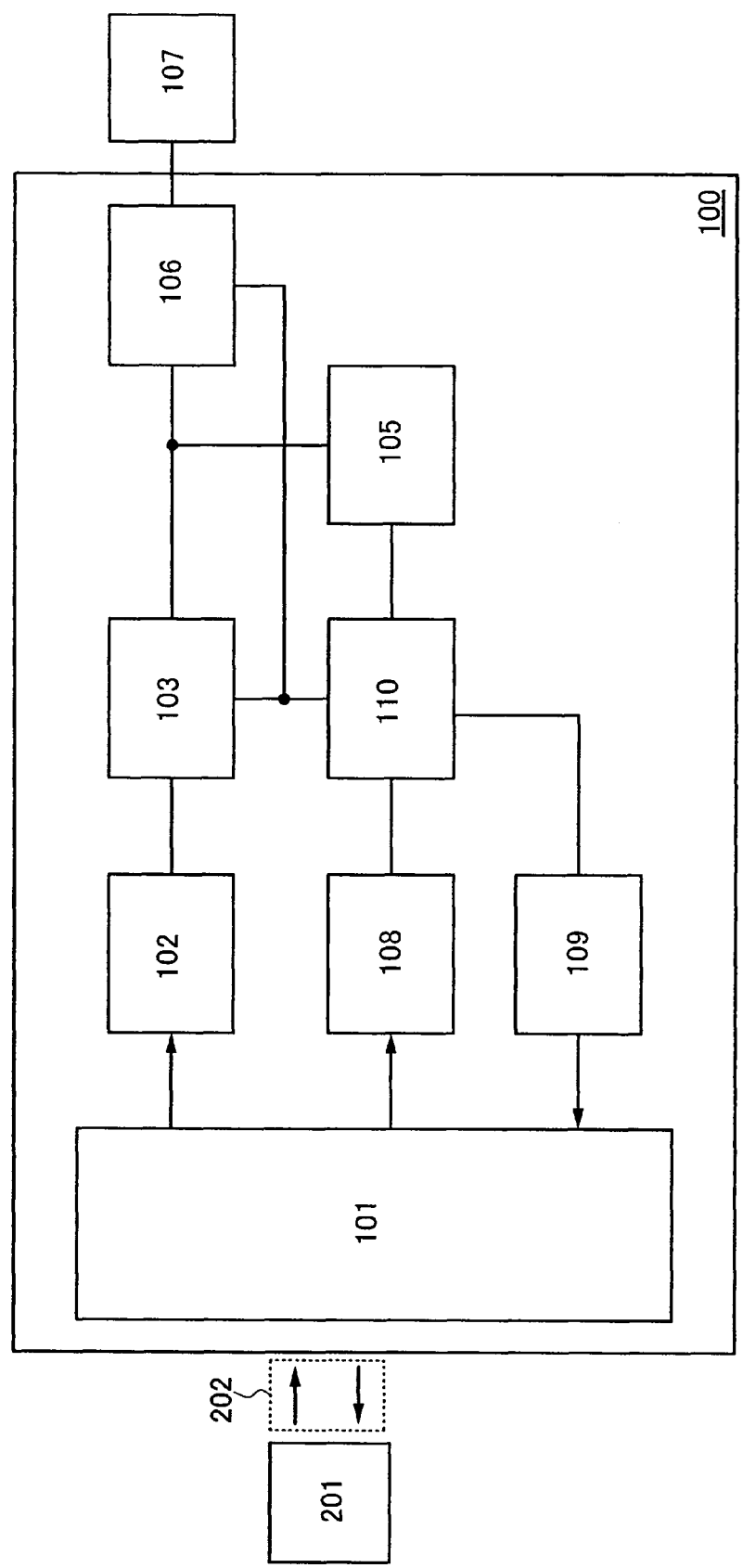
FIG. 2 shows a structural example of a wireless power storage device of the invention.

The wireless power storage device 100 described in this embodiment mode includes the antenna circuit 101, the rectifier circuit 102, the charge control circuit 103, the battery 105, the discharge control circuit 106, a demodulation circuit 108, a modulation circuit 109, and a charge/discharge control circuit 110 (refer to FIG. 2). In the wireless power storage device 100, when an electromagnetic wave is received from outside by the antenna circuit 101 and the received electromagnetic wave is input to the battery 105 via the rectifier circuit 102, the battery 105 is charged. Further, when electrical power charged to the battery 105 is supplied to the load portion 107, the battery 105 is discharged. Note that the wireless power storage device described in this embodiment mode has the structure of the wireless power storage device 100 described in the previous embodiment mode, with the addition of the demodulation circuit 108, the modulation circuit 109, and the charge/discharge control circuit 110.

The wireless power storage device 100 described in this embodiment mode can employ a structure where in the structure shown in FIG. 5B, the charge control circuit 103 controls on and off of the switch 402 in accordance with charging conditions of the battery 105. A structure in which on and off of the switch 402 are controlled by the charge/discharge control circuit 110 can be employed.

The charge/discharge control circuit 110 may be any circuit which monitors charging conditions of the battery 105, and controls the switch provided in the charge control circuit 103 and the switch provided in the discharge control circuit 106 in accordance with charging conditions of the battery 105. For example, a structure can be employed in which the charge/discharge control circuit 110 monitors the voltage level of the battery 105, and when the voltage level of the battery 105 equals or exceeds a certain level, the charge/discharge control circuit 110 turns the switch in the charge control circuit 103 off and turns the switch in the discharge control circuit 106 on so that electrical power is supplied to the load portion 107. Further, a structure can be employed in which when the voltage level of the battery 105 falls below a specified level, the charge/discharge control circuit 110 turns the switch in the discharge control circuit 106 off and turns the switch in the charge control circuit 103 on so that the battery 105 is charged.

By using the charge control circuit 103 to control charging of the battery 105 in accordance with charging conditions of the battery 105 in this manner, overcharging of the battery 105 when the battery 105 is charged can be suppressed. Further, by turning the switch 402 of the charge control circuit 103 off when the battery 105 is not being charged, leakage of electrical power charged to the battery 105 can be prevented.

Below, a case where the battery 105 is charged and discharged using a power feeder 201 will be described.

First, an electromagnetic wave input to the antenna circuit 101 from the power feeder 201 is converted to an alternating current electrical signal in the antenna circuit 101. The alternating current electrical signal is rectified by the rectifier circuit 102, and then input to the charge control circuit 103. Further, at the same time, a signal which signals the start of charging of the battery 105 is input to the charge/discharge control circuit 110 via the demodulation circuit 108. When the signal which signals the start of charging is input, the charge/discharge control circuit 110 controls on and off of the switch in the charge control circuit 103 in accordance with charging conditions of the battery 105. For example, when the charge/discharge control circuit 110 monitors the voltage level of the battery 105 and the voltage level of the battery 105 equals or falls below a certain level, the charge/discharge control circuit 110 turns on the switch provided in the charge control circuit 103 and starts charging of the battery 105.

Note that in a case where it is not necessary to charge the battery 105 when the voltage level of the battery 105 equals or exceeds a certain level, the switch in the charge control circuit 103 is turned off and the battery 105 is not charged. In such a case, a signal which stops charging of the battery 105 can be transmitted to the power feeder 201 via the modulation circuit 109 and transmission of electromagnetic waves from the power feeder 201 can be stopped.

Subsequently, the battery 105 is charged, and when the voltage of the battery 105 equals or exceeds a certain level, the switch in the charge control circuit 103 is turned off and charging of the battery 105 is terminated. Then, a signal which stops charging of the battery 105 can be transmitted to the power feeder 201 via the modulation circuit 109 and transmission of electromagnetic waves from the power feeder 201 can be stopped.

Figure 13:
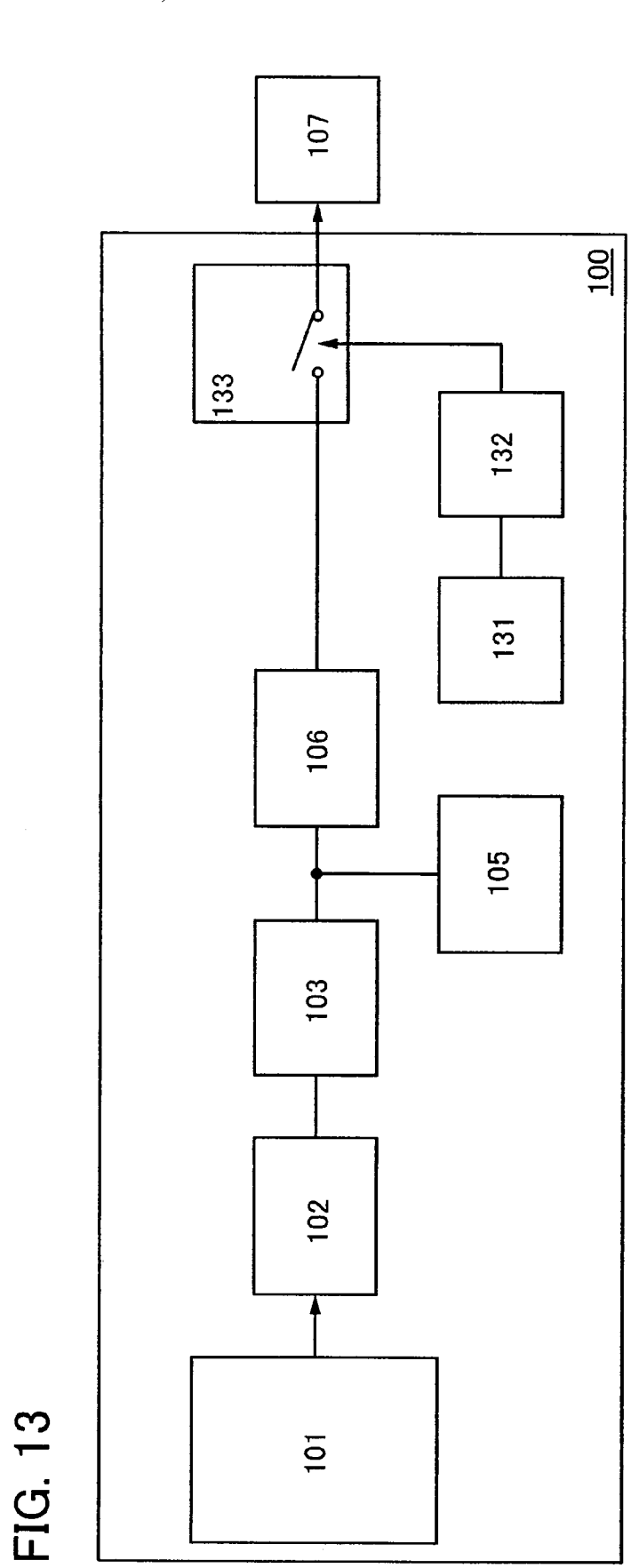
FIG. 13 shows a structural example of a wireless power storage device of the invention.

Subsequently, the switch of the discharge control circuit 106 is turned on, and electrical power is supplied from the battery 105 to the load portion 107. The load portion 107 can use the electrical power supplied from the battery 105 to operate a circuit provided in the load portion 107. For example, a sensor can be provided in the load portion 107 and the load portion 107 can use the electrical power supplied from the battery 105 to intermittently operate the sensor. In such a case, as shown in FIG. 13 of Embodiment Mode 1, a switching circuit 133 may be provided between the discharge control circuit 106 and the load portion 107, and electrical power may be supplied from the battery 105 to the sensor intermittently.

Note that charging conditions of the battery 105 are monitored by the charge/discharge control circuit 110, and when the voltage of the battery 105 equals or falls below a certain level, the switch of the discharge control circuit 106 is turned off, and discharging of the battery 105 is stopped.

Figure 4A:
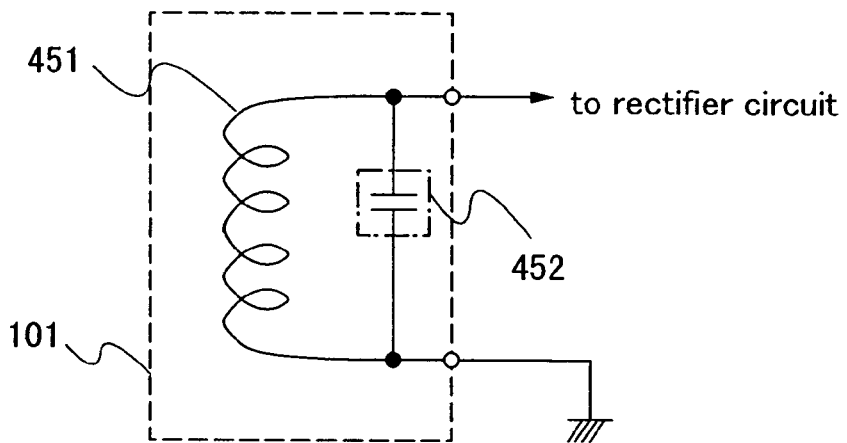
FIGS. 4A and 4B show structural examples of a wireless power storage device of the invention.
Figure 4B:
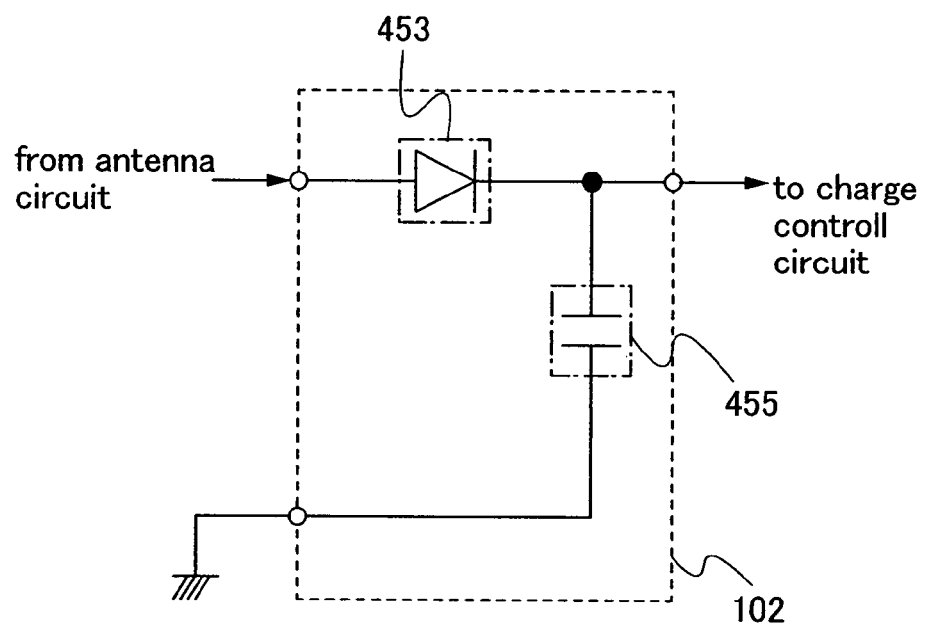
Figure 9:
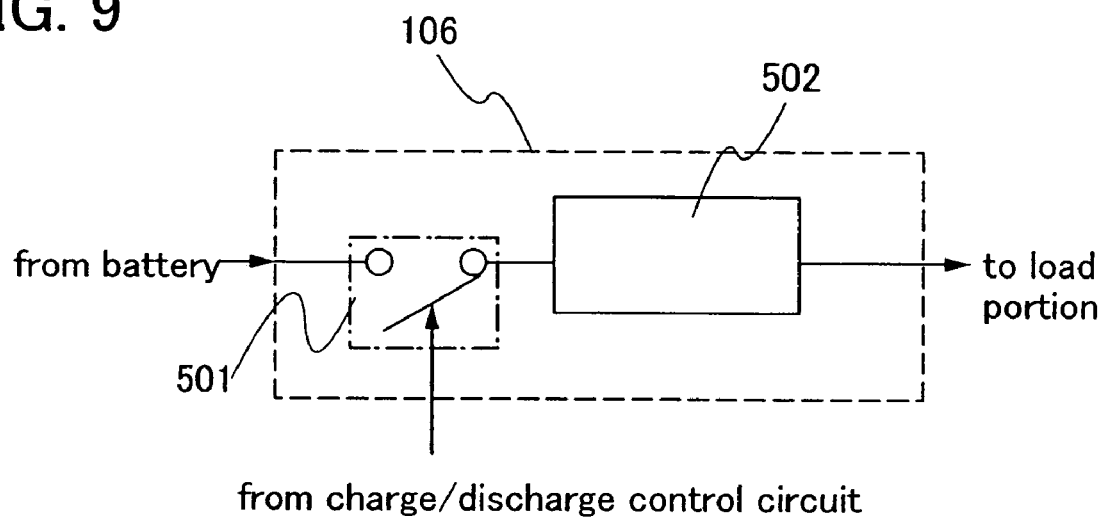
FIG. 9 shows a structural example of a wireless power storage device of the invention.

Further, in the wireless power storage device described in this embodiment mode, the structure shown in FIG. 4A can be applied to the antenna circuit 101, and the structure shown in FIG. 4B can be applied to the rectifier circuit 102. Further, the structure shown in FIG. 5B is applied to the charge control circuit 103, and on and off of the switch 402 is controlled by the charge/discharge control circuit 110. Further, a structure in which the discharge control circuit 106 has the structure shown in FIG. 7A and on and off of the switch 501 is controlled by the charge/discharge control circuit 110 can be employed (refer to FIG. 9).

Figure 6:
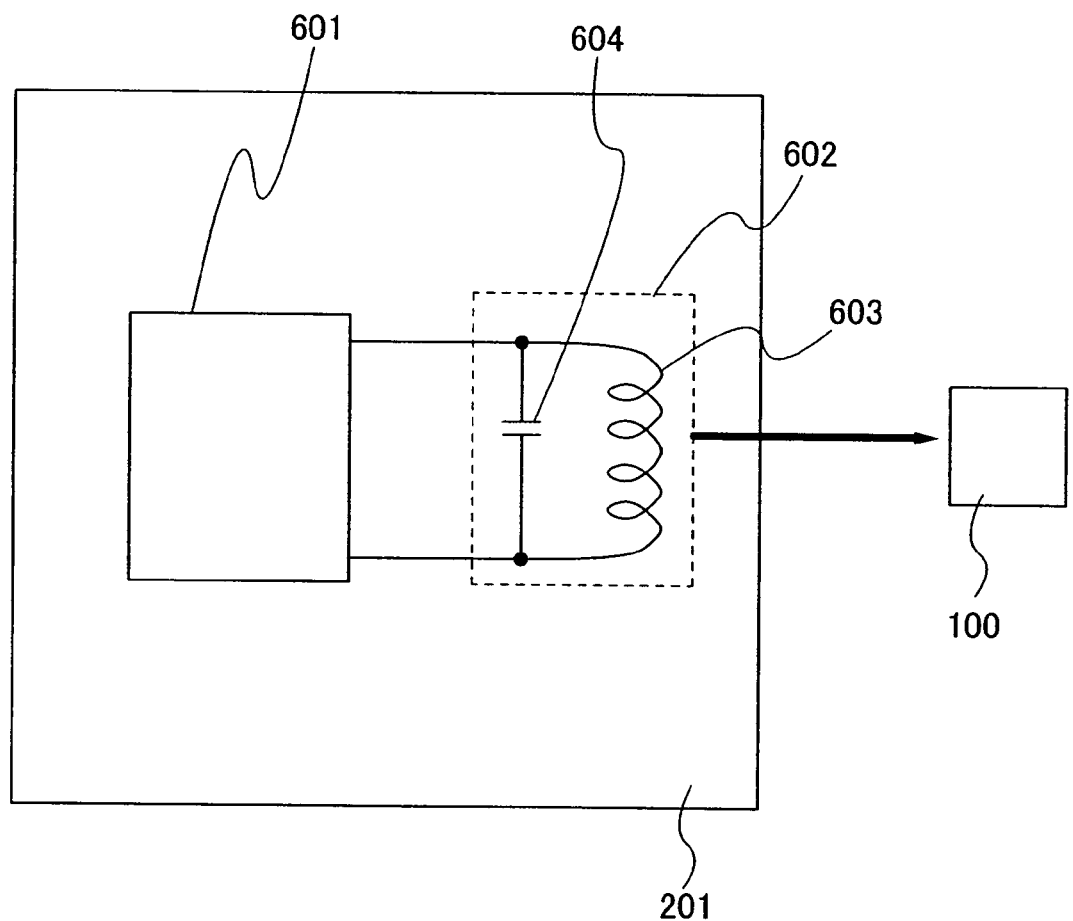
FIG. 6 shows a structural example of a power feeder which supplies electromagnetic waves to a wireless power storage device of the invention.

Further, the power feeder 201 in FIG. 2 can include a power transmission control portion 601 and an antenna circuit 602 (refer to FIG. 6). The power transmission control portion 601 modulates an electrical signal, which is for power transmission, that is transmitted to the wireless power storage device 100, and outputs an electromagnetic wave, which is for power transmission, from the antenna circuit 602. In this embodiment mode, the antenna circuit 602 of the power feeder 201 shown in FIG. 6 is connected to the power transmission control portion 601, and includes an antenna 603 and a resonant capacitor 604 which form an LC parallel resonant circuit. When power is transmitted, the power transmission control portion 601 supplies an induced current to the antenna circuit 602, and outputs an electromagnetic wave, which is for power transmission, to the wireless power storage device 100 from the antenna 603.

Further, concerning the frequency of the signal transmitted from the power feeder 201, any of a 300 GHz to 3 THz submillimeter wave, a 30 GHz to 300 GHz millimeter wave, a 3 GHz to 30 GHz microwave, a 300 MHz to 3 GHz ultrahigh frequency wave, a 30 MHz to 300 MHz very high frequency wave, a 3 MHz to 30 MHz high frequency wave, a 300 kHz to 3 MHz medium frequency wave, a 30 kHz to 300 kHz low frequency wave, and a 3 kHz to 30 kHz very low frequency wave can be used, for example.

Further, in the wireless power storage device 100 described in this embodiment mode, charging of the battery is conducted cumulatively, and discharging of the battery is conducted in pulses, as shown in Embodiment Mode 1.

Figure 3B:
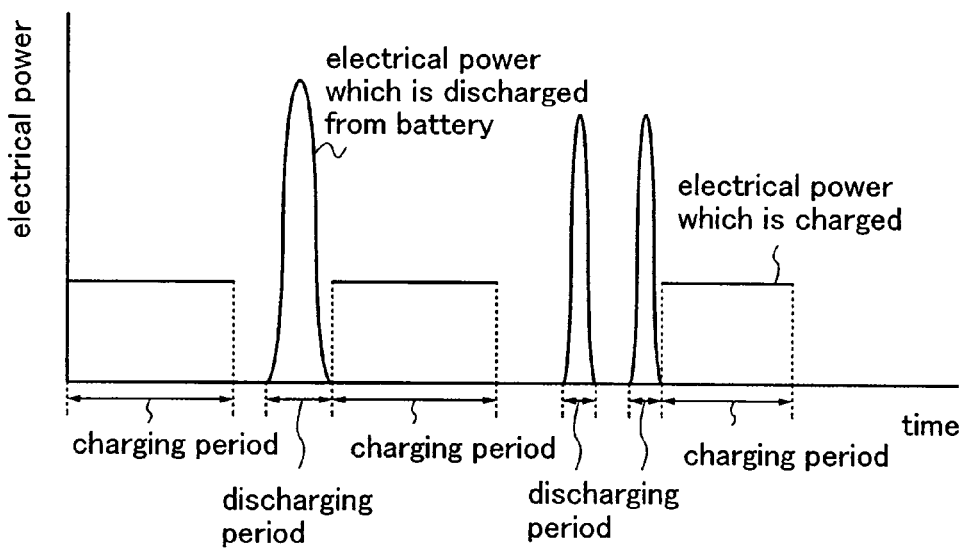

For example, a structure can be employed in which charging is stopped when charging of the battery 105 is completed, and the battery 105 is charged when the voltage level of the battery 105 equals or falls below a certain level due to supply of electrical power to the load portion 107 (refer to FIG. 3B). Concerning discharging of the battery 105, a structure may be employed in which the switch in the discharge control circuit 106 is kept on until the voltage level of the battery 105 equals or falls below a certain level, and electrical power is supplied every time the load portion 107 operates. A structure in which the switch of the discharge control circuit 106 is controlled using a signal from outside may also be employed.

When electromagnetic waves are received over a certain period of time and the battery is charged, and the stored electrical power is discharged in pulses, as described above, even when an electromagnetic wave used for charging the battery is weak, a large amount of electrical power can be supplied from the battery to the load portion. In this case, the period of time the battery is charged for is longer than the period of time the battery is discharged for. Further, the amount of electrical power discharged from the battery (the amount of electrical power supplied to the load portion 107) per unit time is larger than the amount of electrical power charged to the battery per unit time.

When a battery which can be charged wirelessly is provided as described above, a wireless power storage device can be charged easily. Further, when electromagnetic waves are received over a certain period of time and a battery is charged, and the stored electrical power is discharged in pulses, even when an electromagnetic wave used for charging the battery is weak, a large amount of electrical power can be supplied from the battery to a load portion.

Note that the wireless power storage device described in this embodiment mode can be combined with structures of wireless power storage devices described in other embodiment modes in this specification.

Embodiment Mode 3

In this embodiment mode, an example of a semiconductor device which includes a wireless power storage device described in either of the previous embodiment modes (a semiconductor device provided with a signal processing circuit as a load) will be described with reference to the drawings. Specifically, an RFID (radio frequency identification) tag (also referred to as an IC (integrated circuit) tag, an IC chip, an RF tag, a wireless tag, a wireless chip, and an electronic tag) will be described as an example of a semiconductor device which communicates data via wireless communication. Note that the structure described in this embodiment mode is not limited to an RFID tag, and can be applied to any semiconductor device which communicates data via wireless communication (e.g., an electronic device which includes a battery).

An example of a semiconductor device described in this embodiment mode will be described with reference to FIG. 10.

Figure 10:
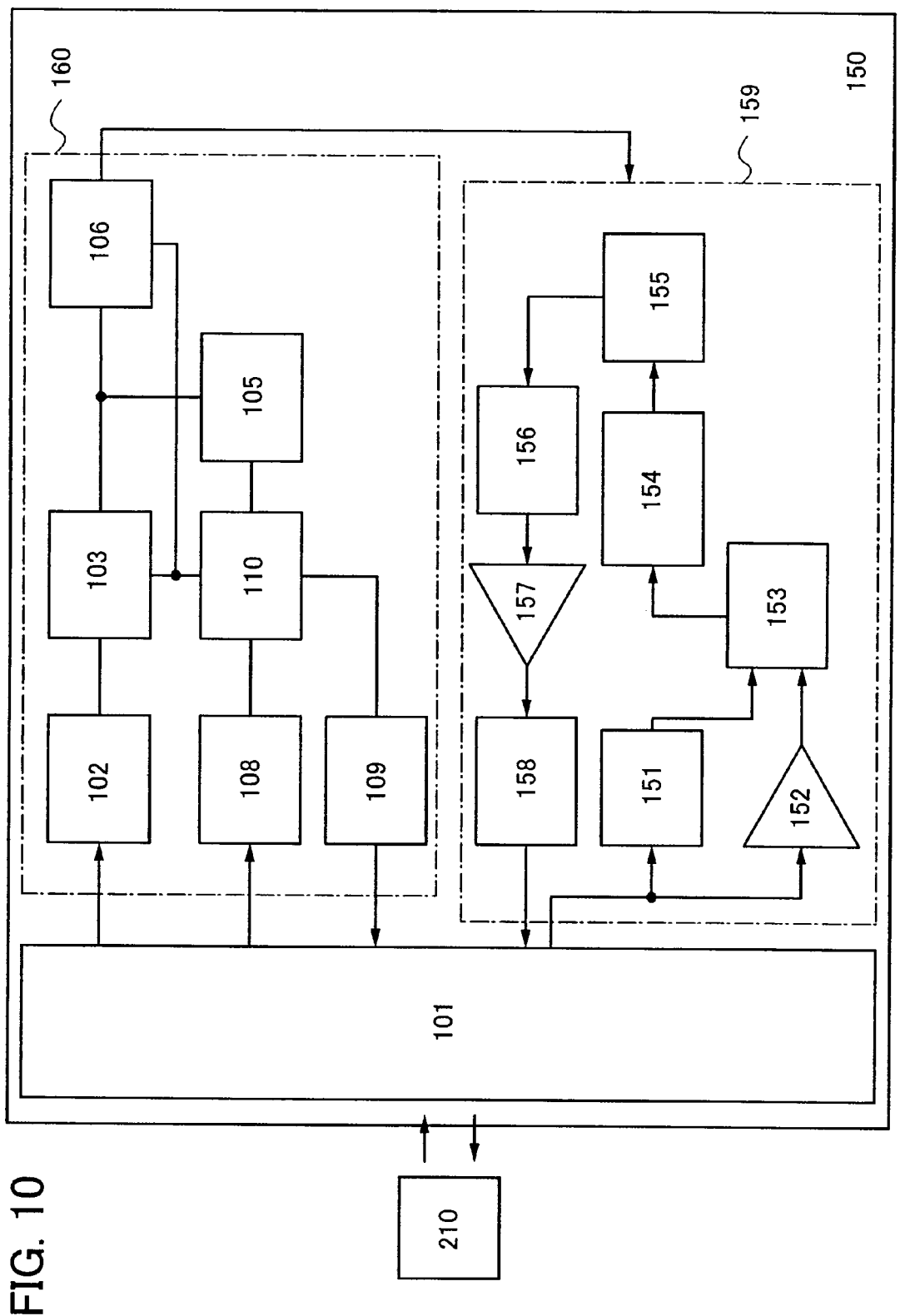
FIG. 10 shows a structural example of a semiconductor device which is provided with a wireless power storage device of the invention.

A semiconductor device 150 shown in FIG. 10 includes the antenna circuit 101, a power supply portion 160, and a signal processing circuit 159.

The power supply portion 160 includes the rectifier circuit 102, the charge control circuit 103, the battery 105, the discharge control circuit 106, the demodulation circuit 108, the modulation circuit 109, and the charge/discharge control circuit 110. Further, the signal processing circuit 159 includes an amplifier 152 (also referred to as an amplifier circuit), a demodulation circuit 151, a logic circuit 153, a memory control circuit 154, a memory circuit 155, a logic circuit 156, an amplifier 157, and a modulation circuit 158. Note that the structure in FIG. 10 differs from that in FIG. 2 of Embodiment Mode 2 in that the power feeder 201 is replaced by a reader/writer 210 and the signal processing circuit 159 is connected to the discharge control circuit 106.

Concerning the signal processing circuit 159, a communication signal transmitted from the reader/writer 210 and received by the antenna circuit 101 is input to the demodulation circuit 151 and the amplifier 152 in the signal processing circuit 159. Generally, the communication signal is a 13.56 MHz or 915 MHz signal or the like which undergoes ASK modulation, PSK modulation, or the like, and is then transmitted. In a case where the communication signal is a 13.56 MHz signal, for example, it is desirable that the frequency of an electromagnetic wave for charging the battery 105 which is transmitted from the reader/writer is the same. Further, when a signal for charging and a signal for communication are in the same frequency band, the antenna circuit 101 can be shared. When the antenna circuit 101 is shared, miniaturization of the semiconductor device can be achieved.

In FIG. 10, in order to process a signal, a clock signal which serves as a reference is necessary. For example, a 13.56 MHz signal can be used as a clock signal. The amplifier 152 amplifies the 13.56 MHz signal and supplies it to the logic circuit 153 as a clock signal. Further, a communication signal which has been ASK modulated or PSK modulated is demodulated by the demodulation circuit 151. The demodulated signal is also transmitted to the logic circuit 153 and is analyzed. The signal which has been analyzed by the logic circuit 153 is transmitted to the memory control circuit 154. Based on that signal, the memory control circuit 154 controls the memory circuit 155, and data stored in the memory circuit 155 is extracted and transmitted to the logic circuit 156. After being encoded by the logic circuit 156 the signal is amplified by the amplifier 157, and the modulation circuit 158 then modulates the amplified signal.

Note that a power supply for the signal processing circuit 159 in FIG. 10 is supplied by the battery 105 through the discharge control circuit 106. The semiconductor device 150 operates in this manner.

Further, an example of the reader/writer 210 in FIG. 10 will be described with reference to FIG. 14. The reader/writer 210 includes a receiver portion 521, a transmitter portion 522, a controller portion 523, an interface portion 524, and an antenna circuit 525. The controller portion 523 controls data processing instructions and data processing results of the receiver portion 521 and the transmitter portion 522 by control of a higher-order device 526 through the interface portion 524. The transmitter portion 522 modulates a data processing instruction which is transmitted to the semiconductor device 150 and outputs it from the antenna circuit 525 as an electromagnetic wave. Further, the receiver portion 521 demodulates a signal received by the antenna circuit 525 and outputs it to the control portion 523 as a data processing result.

Figure 14:
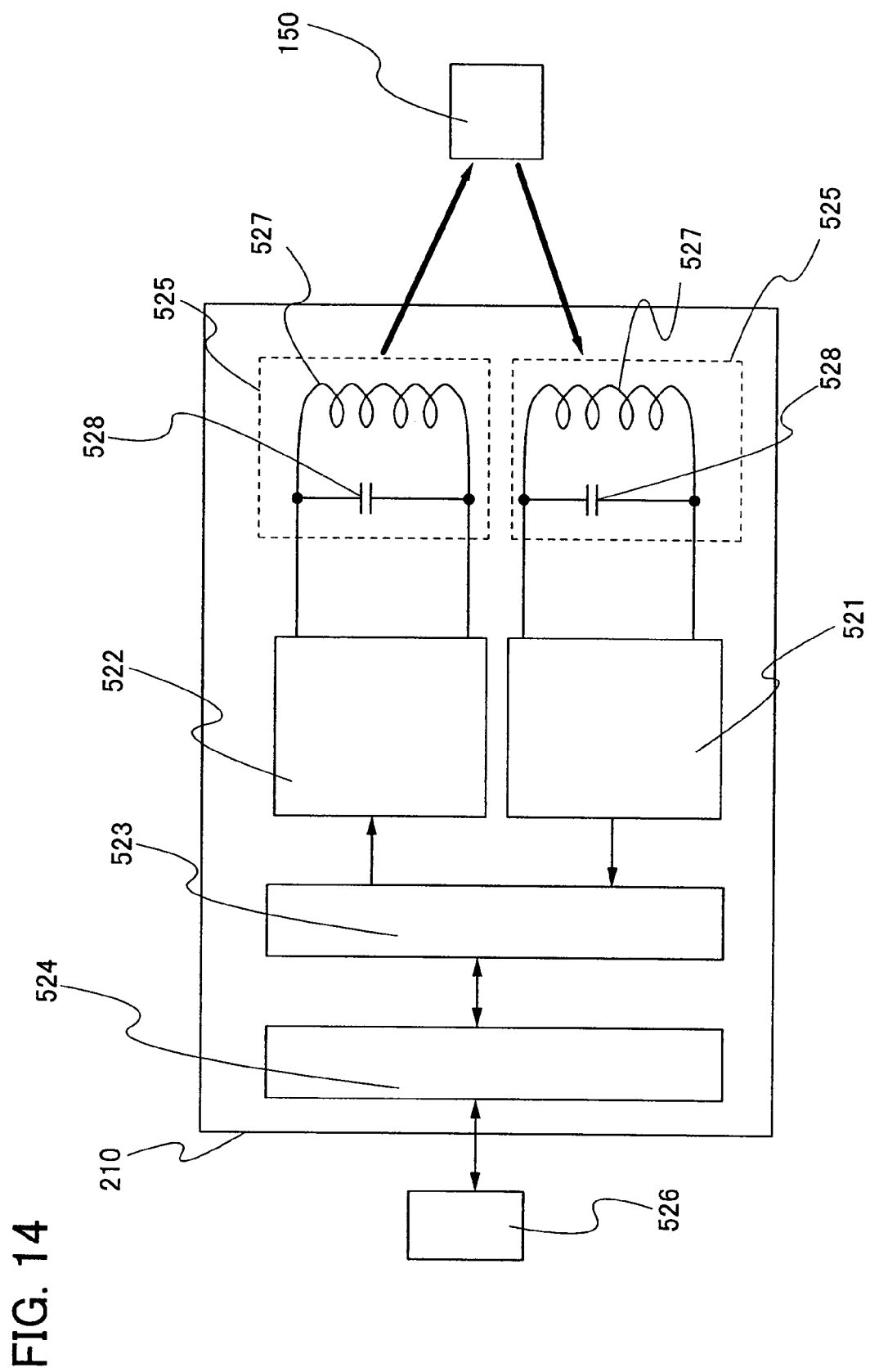
FIG. 14 shows a structural example of a reader/writer which supplies electromagnetic waves to a semiconductor device which is provided with a wireless power storage device of the invention.

In this embodiment mode, the antenna circuit 525 of the reader/writer 210 shown in FIG. 14 is connected to the receiver portion 521 and the transmitter portion 522, and includes an antenna 527 and a resonant capacitor 528 which form an LC parallel resonant circuit. Through a signal output by the semiconductor device 150, the antenna circuit 525 receives electromotive force induced by the antenna circuit 525 as an electrical signal. Further, an induced current is supplied to the antenna circuit 525, and a signal is transmitted from the antenna circuit 525 to the semiconductor device 150.

Figure 12:
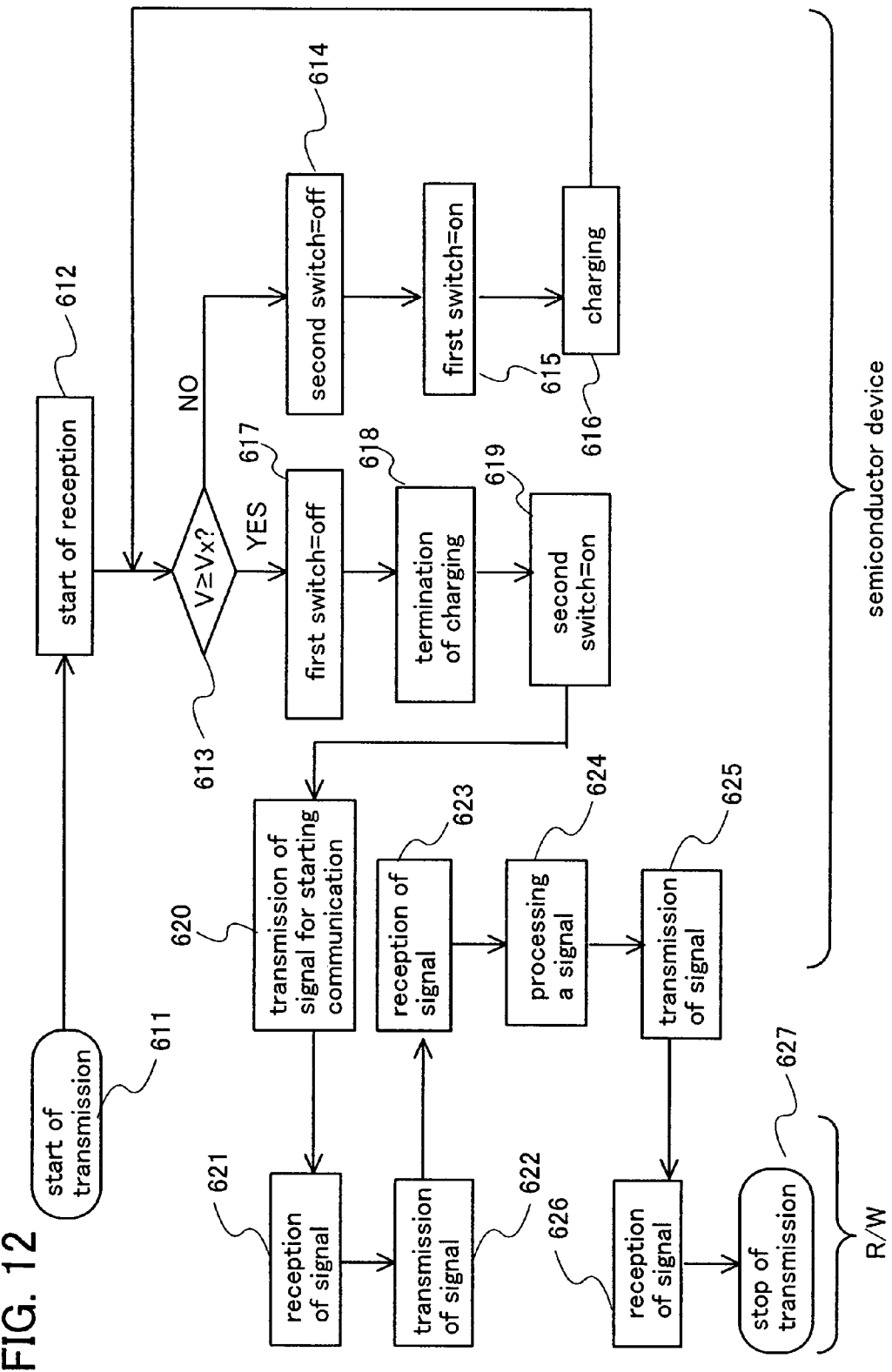
FIG. 12 shows an example of an operation of a semiconductor device which is provided with a wireless power storage device of the invention.

Next, an example of an operation in a case where the antenna circuit 101 receives an electromagnetic wave from the reader/writer 210 will be described with reference to FIG. 12. Note that here, an example is described in which the charge control circuit 103 is provided with a first switch and the discharge control circuit 106 is provided with a second switch.

First, when an electromagnetic wave is transmitted from the reader/writer 210 (611), the antenna circuit 101 commences reception of the electromagnetic wave transmitted from the reader/writer 210 (612). Next, the charge/discharge control circuit 110 determines whether or not the voltage of the battery 105 is equal to or greater than a predetermined voltage level (e.g., Vx) (613). Then, in the case where the voltage of the battery 105 is less than Vx, the second switch provided in the discharge control circuit 106 is turned off so that electrical power of the battery 105 is not supplied to other circuits (614).

Next, the first switch is turned on (615) and charging of the battery 105 commences (616). During charging, charging conditions of the battery 105 are monitored by the charge/ discharge control circuit 110, and the voltage level of the battery 105 is monitored. Then, when the voltage of the battery 105 equals or exceeds the predetermined voltage level, the first switch provided in the charge control circuit 103 is turned off (617), and charging is terminated (618).

Next, the second switch is turned on at the same time as or after the first switch is turned off (619); electrical power is supplied to a circuit provided in the signal processing circuit 159 through the discharge control circuit 106; and the semiconductor device 150 transmits an electromagnetic wave which contains a signal for starting communication (hereinafter also referred to as simply a 'signal') to the reader/writer 210 (620). Then, after the reader/writer 210 has received the signal (621), necessary information is transmitted to the semiconductor device 150 (622). The semiconductor device 150 receives the signal transmitted from the reader/writer 210 (623), processes the received signal (624), and transmits a reply signal (625). Then, the reader/writer 210 receives the signal transmitted from the semiconductor device 150 (626), and then terminates communication (627).

Figure 11:
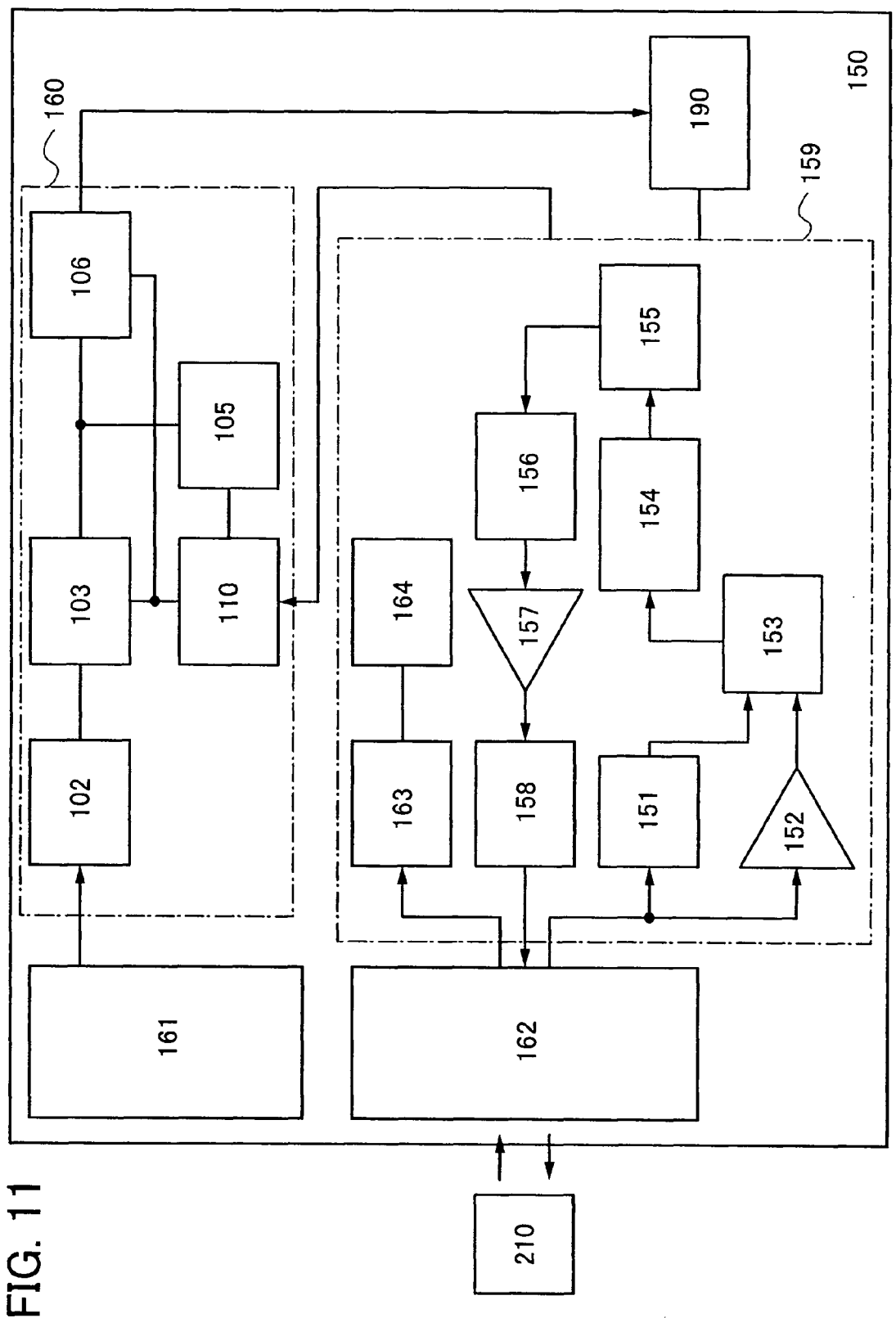
FIG. 11 shows a structural example of a semiconductor device which is provided with a wireless power storage device of the invention.

Note that in the structure shown in FIG. 10, a case where the power supply portion 160 and the signal processing circuit 159 share the antenna circuit 101 is shown; however, a structure in which the power supply portion 160 and the signal processing circuit 159 each have an antenna circuit may be employed. A structure in which the power supply portion 160 is provided with a first antenna circuit 161 and the signal processing circuit 159 is provided with a second antenna circuit 162 is described with reference to FIG. 11. Note that FIG. 11 illustrates a case where the first antenna circuit 161 receives electromagnetic waves which are generated at random outside, and the second antenna circuit 162 receives electromagnetic waves having a specified wavelength which are transmitted from the reader/writer 210. That is, a structure in which the first antenna circuit 161 receives an electromagnetic wave having a different frequency to that of an electromagnetic wave which the second antenna circuit 162 receives can be employed.

In the semiconductor device shown in FIG. 11, the first antenna circuit 161 takes in a weak electromagnetic wave generated at random outside, and the battery 105 is charged little by little over a certain amount of time. Note that the charge/discharge control circuit 110 monitors charging conditions of the battery 105, and prevents overcharging of the battery 105 by controlling on and off of the switches provided in the charge control circuit 103 and the discharge control circuit 106. Further, here, a structure is shown in which electrical power charged to the battery 105 is supplied to a sensor portion 190 provided in the semiconductor device 150.

Further, the second antenna circuit 162 receives an electromagnetic wave having a specified wavelength which is transmitted from the reader/writer 210, and information is transmitted and received between the semiconductor device 150 and the reader/writer 210. By providing a rectifier circuit 163 and a power supply circuit 164 in the signal processing circuit 159, electrical power necessary for transmission and reception of information between the semiconductor device 150 and the reader/writer 210 can be secured. Note that a structure may be employed where in the signal processing circuit 159, electrical power is supplied from the battery 105 when more electrical power is necessary.

Further, supply of electrical power to the sensor 190 can be performed by controlling the switch provided in the discharge control circuit 106 through the charge/discharge control circuit 110 based on a signal received from outside by the signal processing circuit 159 (a signal which operates the sensor portion 190).

Further, as shown in FIG. 13 of Embodiment Mode 1, a structure may be employed in which a switching circuit 133 is provided between the discharge control circuit 106 and the sensor portion 190, and the sensor portion 190 is operated by intermittently supplying electrical power from the battery 105 to the sensor portion 190. In that case, a structure can be employed in which information from when the sensor portion 190 periodically operates is stored in the memory circuit of the signal processing circuit 159, and when transmission and reception of information between the reader/writer 210 and the semiconductor device 150 are performed, the information stored in the memory circuit is transmitted to the reader/writer 210.

As described above, by providing a battery capable of wireless charging, a wireless power storage device provided in a semiconductor device can easily be charged. Further, when electromagnetic waves are received over a certain period of time and the battery is charged cumulatively, and the stored electrical power is discharged in pulses, a large amount of electrical power can be supplied from the battery to a load portion even when an electromagnetic wave used for charging the battery is weak. In particular, the semiconductor device described in this embodiment mode is effective when the battery is charged by the antenna circuit receiving weak electromagnetic waves generated at random outside.

Note that the semiconductor device structure described in this embodiment mode can be combined with structures of wireless power storage devices described in other embodiment modes in this specification.

Embodiment Mode 4

In this embodiment mode, an example of a manufacturing method of the semiconductor device described in Embodiment Mode 3 will be described with reference to the drawings. In this embodiment mode, a structure in which an antenna circuit, a power supply portion, and a signal processing circuit are provided over the same substrate will be described. Note that it is desirable to form the antenna circuit, the power supply portion, and the signal processing circuit over substrate at one time and to employ thin film transistors (TFTs) as transistors included in the power supply portion and the signal processing circuit, because thereby miniaturization can be achieved.

First, as shown in FIG. 15A, a separation layer 1903 is formed over a surface of a substrate 1901 with an insulating film 1902 therebetween. Next, an insulating film 1904 which serves as a base film and a semiconductor film 1905 (e.g., a film which includes amorphous silicon) are stacked. Note that the insulating film 1902, the separation layer 1903, the insulating film 1904, and the semiconductor film 1905 can be formed in succession.

Further, the substrate 1901 may be a glass substrate, a quartz substrate, a metal substrate (e.g. a stainless steel substrate or the like), a ceramic substrate, or a semiconductor substrate, such as a Si substrate. Alternatively, a plastic substrate formed of polyethylene terephthalate (PET), polyethylene naphthalate (PEN), polyether sulfone (PES), acrylic, or the like can be used. Note that in this step, the separation layer 1903 is provided over an entire surface of the substrate 1901 with the insulating film 1902 interposed therebetween; however, if necessary, the separation layer may be selectively provided by using a photolithography method after providing the separation layer over an entire surface of the substrate 1901.

The insulating film 1902 and the insulating film 1904 are formed using an insulating material such as silicon oxide, silicon nitride, silicon oxynitride (SiOxNy, where x>y), or silicon nitride oxide (SiNxOy, where x>y), by a CVD method, a sputtering method, or the like. For example, when the insulating film 1902 and the insulating film 1904 have a two-layer structure, preferably a silicon nitride oxide film is formed as a first insulating film and a silicon oxynitride film is formed as a second insulating film. Alternatively, a silicon nitride film may be formed as a first insulating film and a silicon oxide film may be formed as a second insulating film. The insulating film 1902 serves as a blocking layer which prevents an impurity element from the substrate 1901 from being mixed into the separation layer 1903 or an element formed thereover. The insulating film 1904 serves as a blocking layer which prevents an impurity element from the substrate 1901 or the separation layer 1903 from being mixed into an element formed thereover. By forming the insulating films 1902 and 1904 which serve as blocking layers in this manner, an element formed thereover can be prevented from being adversely affected by an alkali metal such as Na or an alkali earth metal from the substrate 1901, or an impurity element included in the separation layer 1903. Note that when quartz is used as the substrate 1901, the insulating films 1902 and 1904 may be omitted from the structure.

As the separation layer 1903, a metal film, a stacked-layer structure including a metal film and a metal oxide film, or the like can be used. As the metal film, a single-layer structure or a stacked-layer structure is formed using a film formed of any of the elements tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or of an alloy material or a compound material containing such an element as a main constituent. These materials can be formed by using a sputtering method, various CVD methods, such as a plasma CVD method, or the like. As the stacked-layer structure including a metal film and a metal oxide film, after the aforementioned metal film is formed, plasma treatment in an oxygen atmosphere or an $N_2O$ atmosphere, or heat treatment in an oxygen atmosphere or an $N_2O$ atmosphere is performed, so that an oxide or an oxynitride of the metal film can be formed on a surface of the metal film. For example, when a tungsten film is formed as the metal film by a sputtering method, a CVD method, or the like, plasma treatment is performed on the tungsten film so that a metal oxide film formed of tungsten oxide can be formed on a surface of the tungsten film.

The semiconductor film 1905 is formed with a thickness of 25 to 200 nm (preferably, 30 to 150 nm) by a sputtering method, an LPCVD method, a plasma CVD method, or the like.

Next, as shown in FIG. 15B, the semiconductor film 1905 is crystallized by being irradiated with laser light. The semiconductor film 1905 may be crystallized by a method which combines laser light irradiation with a thermal crystallization method which employs RTA or an annealing furnace or a thermal crystallization method which employs a metal element for promoting crystallization, or the like. Subsequently, the obtained crystalline semiconductor film is etched into a desired shape to form crystallized crystalline semiconductor films 1905a to 1905f, and a gate insulating film 1906 is formed so as to cover the semiconductor films 1905a to 1905f.

Note that the gate insulating film 1906 is formed using an insulating material such as silicon oxide, silicon nitride, silicon oxynitride, or silicon nitride oxide, by a CVD method, a sputtering method, or the like. For example, when the gate insulating film 1906 has a two-layer structure, preferably a silicon oxynitride film is formed as a first insulating film and a silicon nitride oxide film is formed as a second insulating film. Alternatively, a silicon oxide film may be formed as the first insulating film and a silicon nitride film may be formed as the second insulating film.

An example of a manufacturing step of the crystalline semiconductor films 1905a to 1905f is briefly described below. First, an amorphous semiconductor film with a film thickness of 50 to 60 nm is formed by a plasma CVD method. Next, a solution containing nickel, which is a metal element for promoting crystallization, is retained on the amorphous semiconductor film, and then dehydrogenation treatment (at 500° C., for one hour) and thermal crystallization treatment (at 550° C., for four hours) are performed on the amorphous semiconductor film to form a crystalline semiconductor film. Subsequently, the crystalline semiconductor film is irradiated with laser light, and the crystalline semiconductor films 1905a to 1905f are formed by using a photolithography method. Note that the amorphous semiconductor film may be crystallized just by laser light irradiation, without performing thermal crystallization which employs a metal element for promoting crystallization.

Note that as a laser oscillator for crystallization, a continuous wave laser beam (a CW laser beam) or a pulsed wave laser beam (a pulsed laser beam) can be used. As a laser beam which can be used here, a laser beam emitted from one or more of the following can be used: a gas laser, such as an Ar laser, a Kr laser, or an excimer laser; a laser whose medium is single crystalline YAG, $YVO_4$, forsterite ($Mg_2SiO_4$), $YAlO_3$, or $GdVO_4$, to which one or more of Nd, Yb, Cr, Ti, Ho, Er, Tm, and Ta has been added as a dopant; or polycrystalline (ceramic) YAG, $Y_2O_3$, $YVO_4$, $YAlO_3$, or $GdVO_4$, to which one or more of Nd, Yb, Cr, Ti, Ho, Er, Tm, and Ta has been added as a dopant; a glass laser; a ruby laser; an alexandrite laser; a Ti:sapphire laser; a copper vapor laser; or a gold vapor laser. Crystals with a large grain size can be obtained by irradiation with fundamental waves of such laser beams or second to fourth harmonics of the fundamental waves. For example, the second harmonic (532 nm) or the third harmonic (355 nm) of an Nd:$YVO_4$ laser (fundamental wave of 1064 nm) can be used. In this case, a power density of approximately 0.01 to 100 $MW/cm^2$ (preferably, 0.1 to 10 $MW/cm^2$) is necessary. Irradiation is conducted with a scanning rate of approximately 10 to 2000 cm/sec. Note that a laser using, as a medium, single crystalline YAG, $YVO_4$, forsterite ($Mg_2SiO_4$), $YAlO_3$, or $GdVO_4$, to which one or more of Nd, Yb, Cr, Ti, Ho, Er, Tm, and Ta has been added as a dopant, or polycrystalline (ceramic) YAG, $Y_2O_3$, $YVO_4$, $YAlO_3$, or $GdVO_4$, to which one or more of Nd, Yb, Cr, Ti, Ho, Er, Tm, and Ta has been added as a dopant; an Ar ion laser; or a Ti:sapphire laser, can be continuously oscillated. Furthermore, pulse oscillation thereof can be performed at a repetition rate of 10 MHz or more by performing Q-switch operation, mode locking, or the like. When a laser beam is oscillated at a repetition rate of 10 MHz or more, during the time in which a semiconductor film is melted by the laser beam and then solidifies, the semiconductor film is irradiated with a next pulse. Accordingly, unlike in a case of using a pulsed laser with a low repetition rate, a solid-liquid interface can be continuously moved in the semiconductor film; therefore, crystal grains which have grown continuously in a scanning direction can be obtained.

Further, high-density plasma treatment may be performed on the semiconductor films 1905a to 1905f to oxidize or nitride surfaces thereof, to form the gate insulating film 1906. For example, the gate insulating film 1906 is formed by plasma treatment in which a mixed gas which contains a rare gas such as He, Ar, Kr, or Xe, and oxygen, nitrogen oxide (NO$_2$), ammonia, nitrogen, hydrogen, or the like, is introduced. When excitation of the plasma in this case is performed by introduction of a microwave, high density plasma can be generated at a low electron temperature. The surface of the semiconductor film can be oxidized or nitrided by oxygen radicals (OH radicals may be included) or nitrogen radicals (NH radicals may be included) generated by this high-density plasma.

By treatment using such high-density plasma, an insulating film with a thickness of 1 to 20 nm, typically 5 to 10 nm, is formed over the semiconductor film. Because the reaction in this case is a solid-phase reaction, interface state density between the insulating film and the semiconductor film can be made very low. Because such high-density plasma treatment oxidizes (or nitrides) a semiconductor film (crystalline silicon, or polycrystalline silicon) directly, the insulating film can be formed with very little unevenness in its thickness. In addition, since crystal grain boundaries of crystalline silicon are also not strongly oxidized, very favorable conditions result. That is, by the solid-phase oxidation of the surface of the semiconductor film by the high-density plasma treatment shown here, an insulating film with good uniformity and low interface state density can be formed without excessive oxidation at crystal grain boundaries.

Note that as the gate insulating film 1906, just an insulating film formed by the high-density plasma treatment may be used, or an insulating film of silicon oxide, silicon oxynitride, silicon nitride, or the like may be formed thereover by a CVD method which employs plasma or a thermal reaction, to make stacked layers. In any case, when transistors include an insulating film formed by high-density plasma in a part of a gate insulating film or in the whole of a gate insulating film, unevenness in characteristics can be reduced.

Furthermore, in the semiconductor films 1905a to 1905f which are obtained by crystallizing a semiconductor film by irradiation with a continuous wave laser beam or a laser beam oscillated at a repetition rate of 10 MHz or more which is scanned in one direction, crystals grow in the scanning direction of the beam. When transistors are disposed so that the scanning direction is aligned with the channel length direction (the direction in which a carrier flows when a channel formation region is formed) and the above-described gate insulating layer is used in combination with the transistors, thin film transistors with less variation in characteristics and high electron field-effect mobility can be obtained.

Next, a first conductive film and a second conductive film are stacked over the gate insulating film 1906. In this embodiment mode, the first conductive film is formed with a thickness of 20 to 100 nm using a CVD method, a sputtering method, or the like. The second conductive film is formed with a thickness of 100 to 400 nm. The first conductive film and the second conductive film are formed using an element such as tantalum (Ta), tungsten (W), titanium (Ti), molybdenum (Mo), aluminum (Al), copper (Cu), chromium (Cr), or niobium (Nb), or using an alloy material or a compound material containing such an element as its main constituent. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Because tungsten and tantalum nitride have high heat resistance, heat treatment for thermal activation can be performed after the first conductive film and the second conductive film are formed. In addition, in the case of using a three-layer structure instead of a two-layer structure, a stacked-layer structure including a molybdenum film, an aluminum film, and a molybdenum film may be used.

Next, a resist mask is formed using a photolithography method, and etching treatment for forming a gate electrode and a gate line is conducted, forming gate electrodes 1907 over the semiconductor films 1905a to 1905f. In this embodiment mode, an example in which the gate electrodes 1907 have a stacked-layer structure which includes a first conductive film 1907a and a second conductive film 1907b is described.

Next, as shown in FIG. 15C, the gate electrodes 1907 are used as masks, and an impurity element imparting n-type conductivity is added to the semiconductor films 1905a to 1905f at a low concentration by an ion doping method or an ion implantation method. Subsequently, a resist mask is selectively formed by a photolithography method, and an impurity element imparting p-type conductivity is added at a high concentration to the semiconductor films 1905a to 1905f. As an impurity element which exhibits n-type conductivity, phosphorus (P), arsenic (As), or the like can be used. As an impurity element which exhibits p-type conductivity, boron (B), aluminum (Al), gallium (Ga), or the like can be used. Here, phosphorus (P) is used as an impurity element which imparts n-type conductivity, and is selectively introduced into the semiconductor films 1905a to 1905f such that they contain phosphorus (P) at a concentration of $1\times10^{15}$ to $1\times10^{19}$/cm$^3$. Thus, n-type impurity regions 1908 are formed. Further, boron (B) is used as an impurity element which imparts p-type conductivity, and is selectively introduced into the semiconductor films 1905c and 1905e such that they contain boron (B) at a concentration of $1\times10^{19}$ to $1\times10^{20}$/cm$^3$. Thus, p-type impurity regions 1909 are formed.

Next, an insulating film is formed so as to cover the gate insulating film 1906 and the gate electrodes 1907. The insulating film is formed as a single layer or stacked layers of a film containing an inorganic material such as silicon, an oxide of silicon, or a nitride of silicon, or a film containing an organic material such as an organic resin, by a plasma CVD method, a sputtering method, or the like. Next, the insulating film is selectively etched using anisotropic etching which etches mainly in a vertical direction, forming insulating films 1910 (also referred to as side walls) which are in contact with side surfaces of the gate electrodes 1907. The insulating films 1910 are used as masks for doping when LDD (lightly doped drain) regions are formed.

Next, using a resist mask formed by a photolithography method, the gate electrodes 1907, and the insulating films 1910 as masks, an impurity element which imparts n-type conductivity is added at a high concentration to the semiconductor films 1905a, 1905b, 1905d, and 1905f, to form n-type impurity regions 1911. Here, phosphorus (P) is used as an impurity element which imparts n-type conductivity, and it is selectively introduced into the semiconductor films 1905a, 1905b, 1905d, and 1905f such that they contain phosphorus (P) at a concentration of $1\times10^{19}$ to $1\times10^{20}$/cm$^3$. Thus the n-type impurity regions 1911, which have a higher concentration than the impurity regions 1908, are formed.

By the above-described steps, N-channel thin film transistors 1900a, 1900b, 1900d, and 1900f, and p-channel thin film transistors 1900c and 1900e are formed, as shown in FIG. 15D.

Note that in the n-channel thin film transistor 1900a, a channel formation region is formed in a region of the semiconductor film 1905a which overlaps with the gate electrode 1907; the impurity regions 1911 which each form either a source region or a drain region are formed in regions which do not overlap with the gate electrode 1907 and the insulating films 1910; and lightly doped drain regions (LDD regions) are formed in regions which overlap with the insulating films 1910 and which are between the channel formation region and the impurity regions 1911. Further, the n-channel thin film transistors 1900*b*, 1900*d*, and 1900*f* are similarly provided with channel formation regions, lightly doped drain regions, and impurity regions 1911.

Further, in the p-channel thin film transistor 1900*c*, a channel formation region is formed in a region of the semiconductor film 1905*c* which overlaps with the gate electrode 1907, and the impurity regions 1909 which each form either a source region or a drain region are formed in regions which do not overlap with the gate electrode 1907. Further, the p-channel thin film transistor 1900*e* is similarly provided with a channel formation region and impurity regions 1909. Note that here, the p-channel thin film transistors 1900*c* and 1900*e* are not provided with LDD regions; however, the p-channel thin film transistors may be provided with an LDD region, and the n-channel thin film transistor is not necessarily provided with an LDD region.

Next, as shown in FIG. 16A, an insulating film is formed as a single layer or stacked layers so as to cover the semiconductor films 1905*a* to 1905*f*, the gate electrodes 1907, and the like; and conductive films 1913, which are electrically connected to the impurity regions 1909 and 1911 which form the source regions or the drain regions of the thin film transistors 1900*a* to 1900*f*, are formed over the insulating film. The insulating film is formed as a single layer or stacked layers, using an inorganic material, such as an oxide of silicon or a nitride of silicon, an organic material, such as a polyimide, a polyamide, benzocyclobutene, an acrylic, or an epoxy, a siloxane material, or the like, by a CVD method, a sputtering method, an SOG method, a droplet discharge method, a screen printing method, or the like. Here, the insulating film has a two-layer structure. A silicon nitride oxide film is formed as a first insulating film 1912*a*, and a silicon oxynitride film is formed as a second insulating film 1912*b*. Further, the conductive films 1913 form source electrodes and drain electrodes of the thin film transistors 1900*a* to 1900*f*.

Note that before the insulating films 1912*a* and 1912*b* are formed or after one or more thin films of the insulating films 1912*a* and 1912*b* are formed, heat treatment is preferably conducted for recovering the crystallinity of the semiconductor film, for activating an impurity element which has been added to the semiconductor film, or for hydrogenating the semiconductor film. As the heat treatment, thermal annealing, a laser annealing method, an RTA method, or the like is preferably used.

The conductive films 1913 are formed as a single layer or stacked layers, using any of the elements aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing one of the above-mentioned elements as its main constituent, by a CVD method, a sputtering method, or the like. An alloy material containing aluminum as its main constituent corresponds to, for example, a material which contains aluminum as its main constituent and also contains nickel, or an alloy material which contains aluminum as its main constituent and which also contains nickel and one or both of carbon and silicon. The conductive films 1913 preferably employ, for example, a stacked-layer structure including a barrier film, an aluminum-silicon (Al—Si) film, and a barrier film, or a stacked-layer structure including a barrier film, an aluminum-silicon (Al—Si) film, a titanium nitride film, and a barrier film. Note that a barrier film corresponds to a thin film formed from titanium, a nitride of titanium, molybdenum, or a nitride of molybdenum. Aluminum and aluminum silicon, which have low resistance and are inexpensive, are ideal materials for forming the conductive films 1913. Further, generation of a hillock of aluminum or aluminum silicon can be prevented when upper and lower barrier layers are formed. Furthermore, when the barrier film is formed from titanium, which is a highly-reducible element, even if a thin natural oxide film is formed over the crystalline semiconductor film, the natural oxide film is chemically reduced, so good contact with the crystalline semiconductor film can be obtained.

Next, an insulating film 1914 is formed so as to cover the conductive films 1913, and over the insulating film 1914, conductive films 1915*a* and 1915*b*, which are each electrically connected to the conductive films 1913 which form source electrodes and drain electrodes of the thin film transistors 1900*a* and 1900*f*, are formed. Further, conductive films 1916*a* and 1916*b*, which are each electrically connected to the conductive films 1913 which form source electrodes and drain electrodes of the thin film transistors 1900*b* and 1900*e*, are formed. Note that the conductive films 1915*a* and 1915*b* may be formed of the same material at the same time as the conductive films 1916*a* and 1916*b*. The conductive films 1915*a* and 1915*b* and the conductive films 1916*a* and 1916*b* can be formed using any of the materials that the conductive films 1913 can be formed of, mentioned above.

Next, as shown in FIG. 16B, conductive films 1917*a* and 1917*b* which serve as antennas are formed such that they are electrically connected to the conductive films 1916*a* and 1916*b*. Here, one of the conductive films 1917*a* and 1917*b* which serve as antennas corresponds to an antenna of the first antenna circuit described in a previous embodiment mode, and the other one of the conductive films 1917*a* and 1917*b* which serve as antennas corresponds to an antenna of the second antenna circuit. For example, if the conductive film 1917*a* is the antenna of the first antenna circuit and the conductive film 1917*b* is the antenna of the second antenna circuit, the thin film transistors 1900*a* to 1900*c* serve as the first signal processing circuit which is described in a previous embodiment mode, and the thin film transistors 1900*d* to 1900*f* serve as the second signal processing circuit described in a previous embodiment mode.

Note that the insulating film 1914 can be provided by a CVD method, a sputtering method, or the like as a single-layer structure which includes an insulating film containing oxygen and/or nitrogen, such as silicon oxide, silicon nitride, silicon oxynitride, or silicon nitride oxide; or a film containing carbon, such as DLC (diamond-like carbon); or an organic material, such as epoxy, polyimide, polyamide, polyvinyl phenol, benzocyclobutene, or acrylic; or a siloxane material, such as a siloxane resin. Alternatively, the insulating film 1914 may have a stacked structure including the above-mentioned materials. Note that a siloxane material corresponds to a material having a Si—O—Si bond. Siloxane has a backbone structure formed of bonds of silicon (Si) and oxygen (O). As a substituent, an organic group containing at least hydrogen (for example, an alkyl group or aromatic hydrocarbon) is used. A fluoro group can also be used as a substituent. Alternatively, an organic group containing at least hydrogen and a fluoro group may be used as a substituent.

The conductive films 1917*a* and 1917*b* are formed from a conductive material, using a CVD method, a sputtering method, a printing method, such as a screen printing method or a gravure printing method, a droplet discharge method, a dispensing method, a plating method, or the like. The conductive material is any of the elements aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing one of the above-mentioned elements as its main constituent, and has a single-layer structure or a stacked-layer structure.

For example, in the case of using a screen printing method to form the conductive films 1917a and 1917b which serve as antennas, the conductive films 1917a and 1917b can be provided by selectively printing a conductive paste in which conductive particles having a grain size of several nm to several tens of μm are dissolved or dispersed in an organic resin. As conductive particles, metal particles of one or more of any of silver (Ag), gold (Au), copper (Cu), nickel (Ni), platinum (Pt), palladium (Pd), tantalum (Ta), molybdenum (Mo), titanium (Ti), and the like; fine particles of silver halide; or dispersive nanoparticles can be used. In addition, as the organic resin included in the conductive paste, one or more organic resins selected from among organic resins which serve as a binder, a solvent, a dispersing agent, or a coating material for the metal particles can be used. An organic resin such as an epoxy resin or a silicon resin can be given as representative examples. Further, when the conductive film is formed, it is preferable to conduct baking after the conductive paste is applied. For example, in the case of using fine particles containing silver as a main constituent (e.g., the grain size is in the range of 1 nm to 100 nm, inclusive) as a material for the conductive paste, the conductive film can be obtained by curing by baking at a temperature in the range of 150 to 300° C. Alternatively, fine particles containing solder or lead-free solder as a main constituent may be used. In that case, preferably fine particles having a grain size of 20 μm or less are used. Solder and lead-free solder have advantages such as low cost.

Further, the conductive films 1915a and 1915b can each serve as a wiring which is electrically connected to a battery in a subsequent process. Furthermore, when the conductive films 1917a and 1917b which serve as antennas are formed, another conductive film may be separately formed such that it is electrically connected to the conductive films 1915a and 1915b, and that conductive film may be used as a wiring connected to the battery. Note that the conductive films 1917a and 1917b in FIG. 16B correspond to the first antenna circuit and the second antenna circuit described in Embodiment Mode 1.

Next, as shown in FIG. 16C, an insulating film 1918 is formed so as to cover the conductive films 1917a and 1917b, and then a layer (hereinafter referred to as an element formation layer 1919) including the thin film transistors 1900a to 1900f, the conductive films 1917a and 1917b, and the like, is separated from the substrate 1901. Here, after using laser light (e.g., UV light) irradiation to form openings in regions where the thin film transistors 1900a to 1900f are not formed, the element formation layer 1919 can be separated from the substrate 1901 using physical force. Alternatively, before the element formation layer 1919 is separated from the substrate 1901, an etchant may be introduced into the formed openings to selectively remove the separation layer 1903. As the etchant, a gas or liquid containing halogen fluoride or an interhalogen compound is used. For example, chlorine trifluoride ($ClF_3$) is used as a gas containing halogen fluoride. Accordingly, the element formation layer 1919 is separated from the substrate 1901. Note that the separation layer 1903 may be partially left instead of being removed entirely. By leaving a part of the separation layer 1903, consumption of the etchant and treatment time required for removing the separation layer can be reduced. Further, the element formation layer 1919 can be left over the substrate 1901 after the separation layer 1903 is removed. Furthermore, by reusing the substrate 1901 after the element formation layer 1919 is separated from it, cost can be reduced.

The insulating film 1918 can be formed using a CVD method, a sputtering method, or the like as a single-layer structure including an insulating film which contains oxygen and/or nitrogen, such as silicon oxide, silicon nitride, silicon oxynitride, or silicon nitride oxide; or a film containing carbon, such as DLC (diamond-like carbon); or an organic material such as epoxy, polyimide, polyamide, polyvinyl phenol, benzocyclobutene, or acrylic; or a siloxane material such as a siloxane resin. Alternatively, the insulating film 1918 can have a stacked-layer structure including one or more of the above-mentioned films.

Figure 17A:
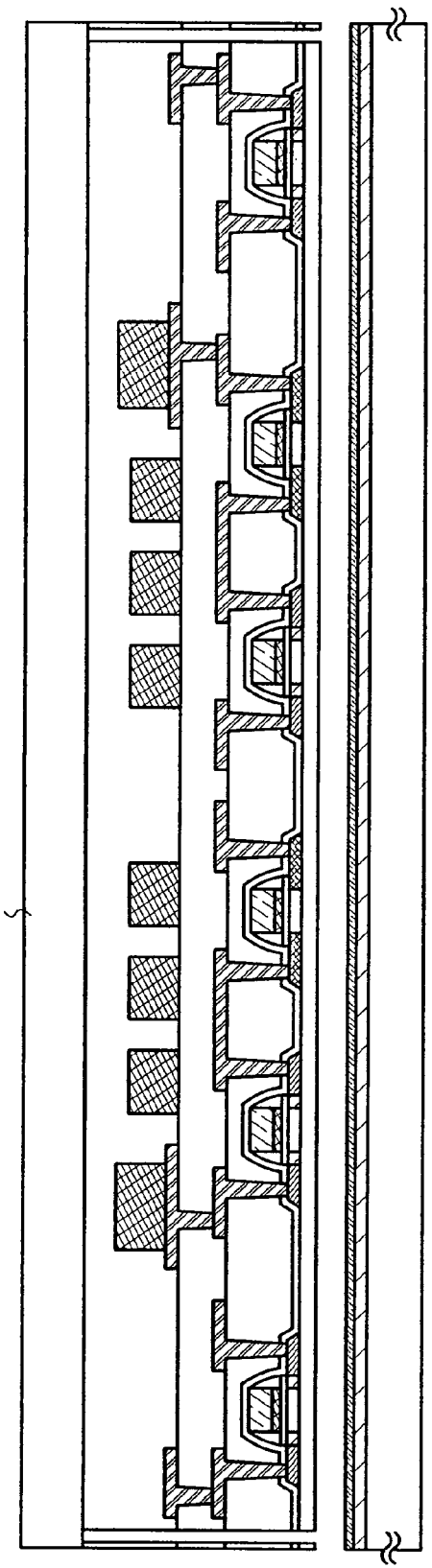
FIGS. 17A and 17B show an example of a method of manufacturing a wireless power storage device of the invention.

In this embodiment mode, as shown in FIG. 17A, the openings are formed in the element formation layer 1919 by laser light irradiation, and then a first sheet material 1920 is attached to one surface of the element formation layer 1919 (a surface where the insulating film 1918 is exposed). Then, the element formation layer 1919 is separated from the substrate 1901.

Figure 17B:
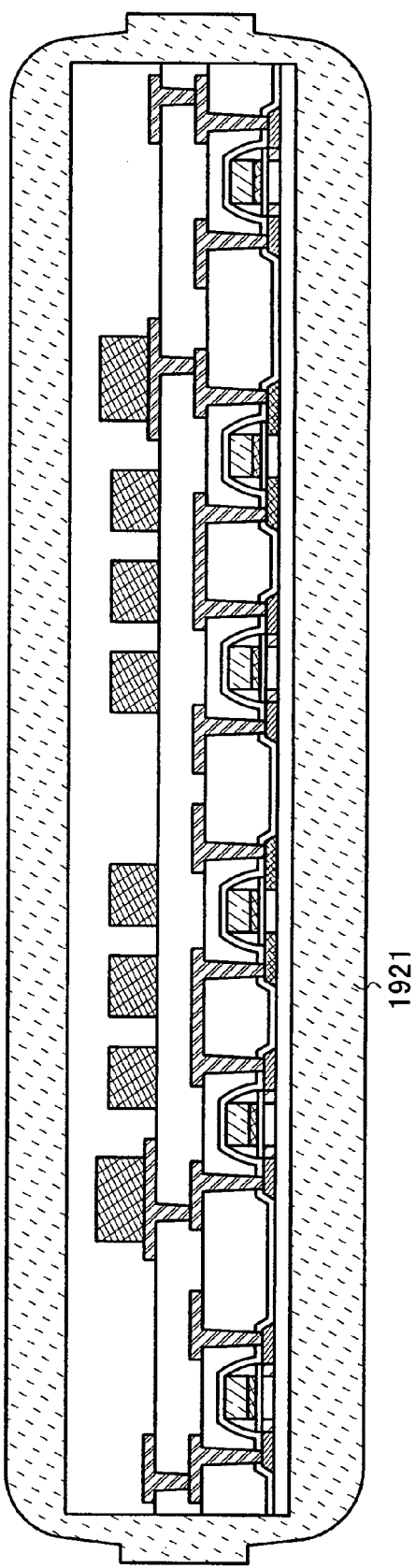

Next, as shown in FIG. 17B, a second sheet material 1921 is attached to the other surface of the element formation layer 1919 (a surface exposed by separation) by performing one or both of heat treatment and pressure treatment. As the first sheet material 1920 and the second sheet material 1921, a hot-melt film or the like can be used.

As the first sheet material 1920 and the second sheet material 1921, films on which antistatic treatment for preventing static electricity or the like has been performed (hereinafter referred to as antistatic films) can be used. Examples of antistatic films are films in which a material that can prevent electrostatic charge is dispersed in a resin, films to which a material that can prevent electrostatic charge is attached, and the like. A film provided with a material that can prevent electrostatic charge may be a film which has a material that can prevent electrostatic charge provided over one of its surfaces, or a film which has a material that can prevent electrostatic charge provided over both of its surfaces. Concerning the film which has a material that can prevent electrostatic charge provided over one of its surfaces, the film may be attached to the layer such that the material that can prevent electrostatic charge is on the inner side of the film or the outer side of the film. Note that the material that can prevent electrostatic charge may be provided over an entire surface of the film, or over a part of the film. As a material that can prevent electrostatic charge, a metal, indium tin oxide (ITO), or a surfactant such as an amphoteric surfactant, a cationic surfactant, or a nonionic surfactant can be used. In addition to that, as an antistatic material, a resin material containing a cross-linked copolymer having a carboxyl group and a quaternary ammonium base on its side chain, or the like can be used. By attaching, mixing, or applying such a material to a film, an antistatic film can be formed. By performing sealing using the antistatic film, the extent to which a semiconductor element is affected by static electricity from outside and the like when dealt with as a product can be reduced.

Note that the battery is formed such that it is connected to the conductive films 1915a and 1915b. The connection with the battery may be made before the element formation layer 1919 is separated from the substrate 1901 (at a stage shown in FIG. 16B or FIG. 16C), or after the element formation layer 1919 is separated from the substrate 1901 (at a stage shown in FIG. 17A), or after the element formation layer 1919 is sealed with the first sheet material and the second sheet material (at a stage shown in FIG. 17B). An example in which the element formation layer 1919 and the battery are formed such that they are connected to each other is described below with reference to FIGS. 18A and 18B and FIGS. 19A and 19B.

Figure 18A:
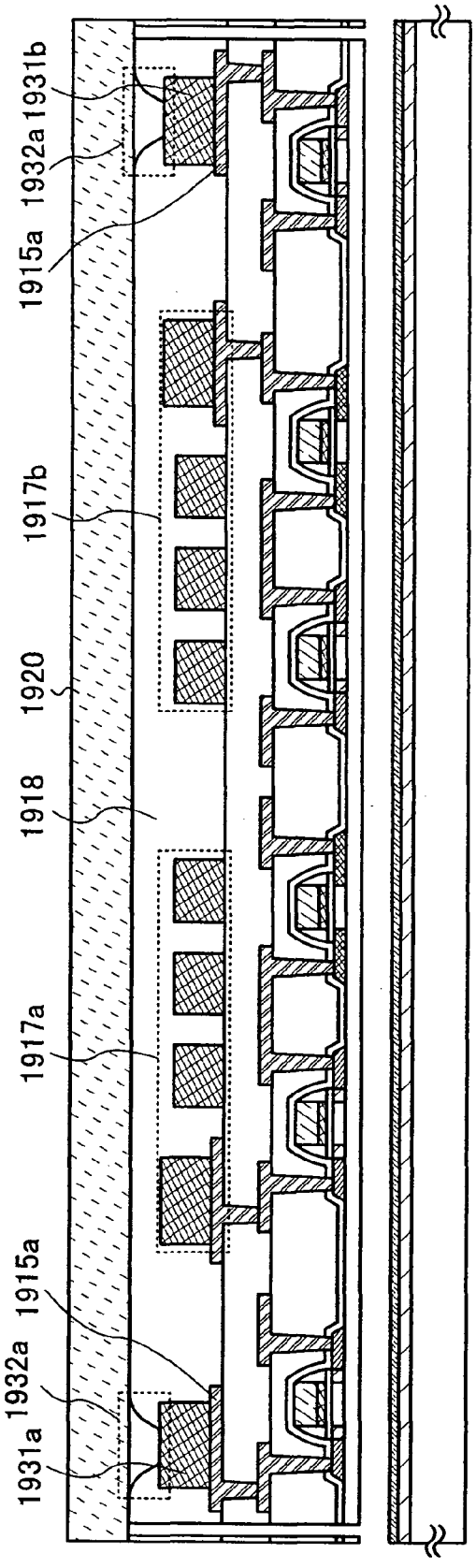
FIGS. 18A and 18B show an example of a method of manufacturing a wireless power storage device of the invention.

In FIG. 16B, conductive films 1931*a* and 1931*b*, which are electrically connected to the conductive films 1915*a* and 1915*b*, respectively, are formed at the same time as the conductive films 1917*a* and 1917*b* which serve as antennas. Next, the insulating film 1918 is formed so as to cover the conductive films 1917*a* and 1917*b* and the conductive films 1931*a* and 1931*b*. Then, openings 1932*a* and 1932*b* are formed so as to expose surfaces of the conductive films 1931*a* and 1931*b*. Subsequently, as shown in FIG. 18A, after openings are formed in the element formation layer 1919 by laser light irradiation, the first sheet material 1920 is attached to one surface of the element formation layer 1919 (the surface where the insulating film 1918 is exposed); and then, the element formation layer 1919 is separated from the substrate 1901.

Figure 18B:
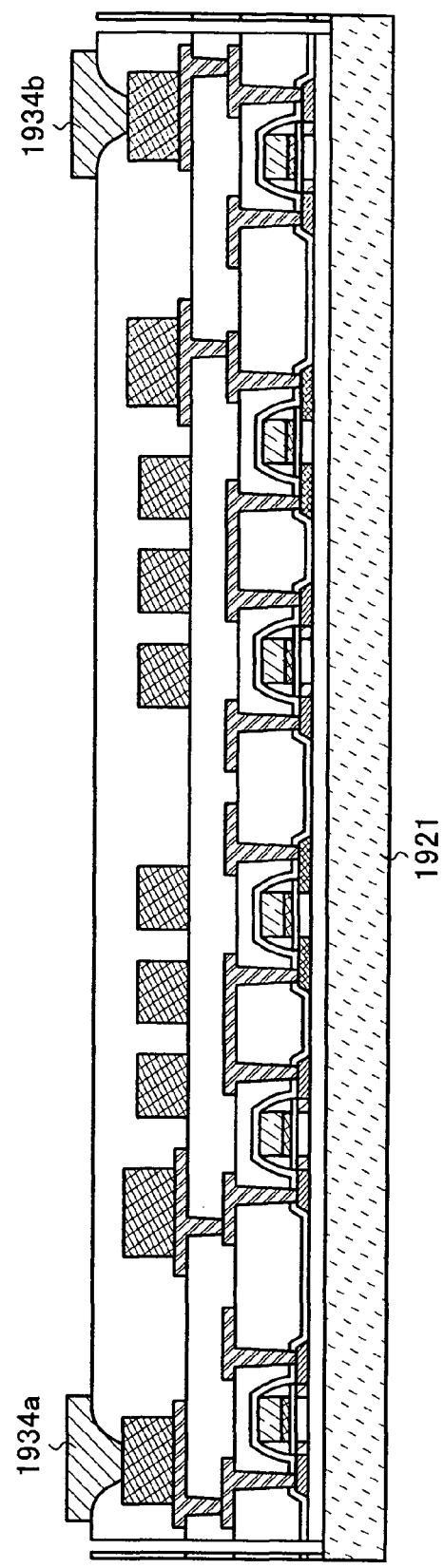

Next, as shown in FIG. 18B, the second sheet material 1921 is attached to the other surface (a surface exposed by separation) of the element formation layer 1919, and the element formation layer 1919 is then separated from the first sheet material 1920. Accordingly, in this embodiment mode, a sheet material with weak adhesion is used as the first sheet material 1920. Then, conductive films 1934*a* and 1934*b*, which are electrically connected to the conductive films 1931*a* and 1931*b*, respectively, through the openings 1932*a* and 1932*b*, are selectively formed.

The conductive films 1934*a* and 1934*b* are formed of a conductive material, using a CVD method, a sputtering method, a printing method such as a screen printing method or a gravure printing method, a droplet discharge method, a dispensing method, a plating method, or the like. The conductive material is any of the elements aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing one of the above-mentioned elements as its main constituent, and has a single-layer structure or a stacked-layer structure.

Note that in this embodiment mode, an example in which the conductive films 1934*a* and 1934*b* are formed after the element formation layer 1919 is separated from the substrate 1901 is described; however, the element formation layer 1919 may be separated from the substrate 1901 after the conductive films 1934*a* and 1934*b* are formed.

Figure 19A:
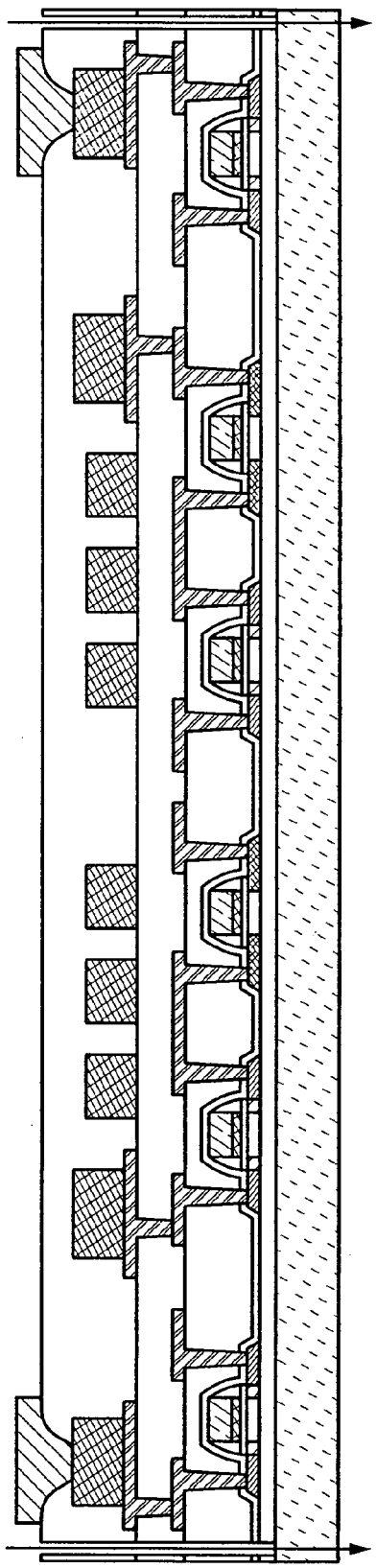
FIGS. 19A and 19B show an example of a method of manufacturing a wireless power storage device of the invention.

Next, as shown in FIG. 19A, in the case where a plurality of elements is formed over the substrate, the element formation layer 1919 is separated into separate elements. A laser irradiation apparatus, a dicing apparatus, a scribing apparatus, or the like can be used for the separation. Here, the plurality of elements formed over one substrate are separated from one another by laser light irradiation.

Figure 19B:
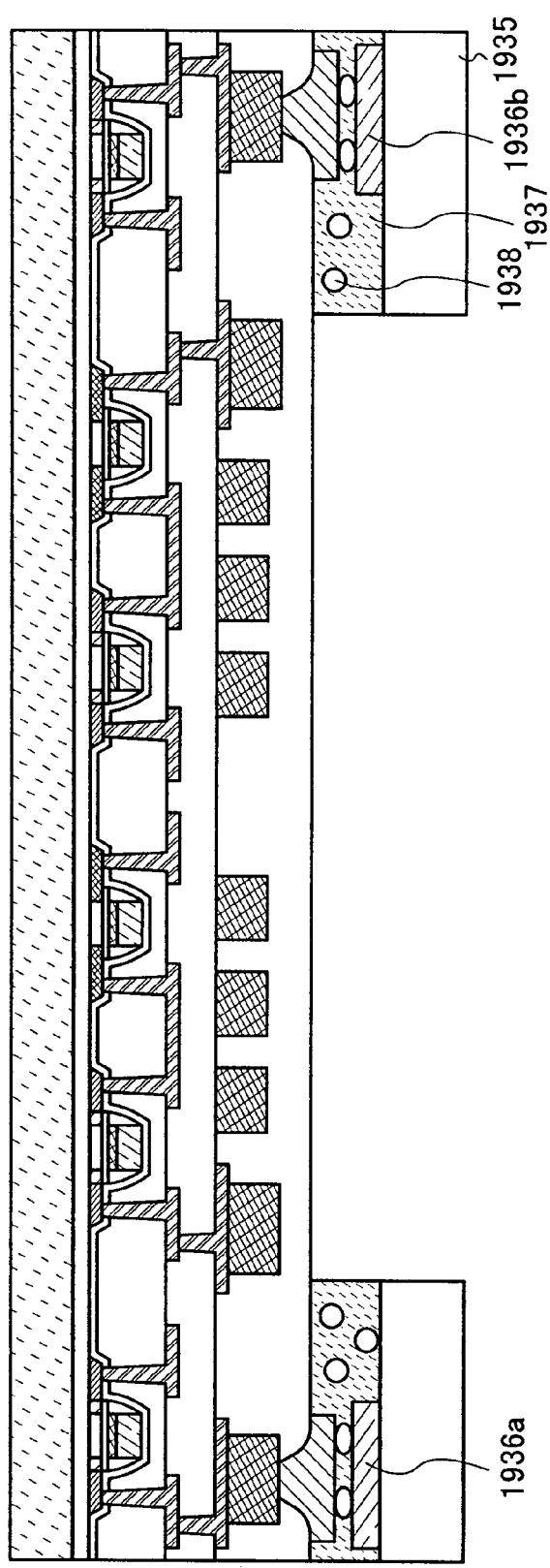

Next, as shown in FIG. 19B, the separated element is electrically connected to connecting terminals of the battery. Here, conductive films 1936*a* and 1936*b* provided on the substrate 1935 which serve as connecting terminals of the battery are connected to the conductive films 1934*a* and 1934*b* provided over the element formation layer 1919, respectively. A case is shown in which the conductive film 1934*a* and the conductive film 1936*a*, or the conductive film 1934*b* and the conductive film 1936*b*, are pressure-bonded to each other with a material having an adhesive property such as an anisotropic conductive film (ACF) or an anisotropic conductive paste (ACP) interposed therebetween, so that they are electrically connected to each other. An example is shown in which conductive particles 1938 contained in a resin 1937 having an adhesive property are used for connection. Alternatively, connection can be performed using a conductive adhesive agent such as a silver paste, a copper paste, or a carbon paste, or using solder bonding, or the like.

In a case where the battery is larger than the element, by forming a plurality of elements over one substrate, as shown in FIGS. 18A and 18B and FIGS. 19A and 19B, separating the elements, then connecting the elements to the battery, the number of elements which can be formed over one substrate can be increased. Accordingly, a semiconductor device can be formed at low cost.

According to the above-described steps, a semiconductor device can be manufactured. Note that in this embodiment mode, a step in which separation is performed after forming elements such as thin film transistors over the substrate was described; however, the substrate over which elements are formed may be used as a product without performing separation. Further, when elements such as thin film transistors are provided over a glass substrate, and the glass substrate is then polished on the side opposite to the surface over which the elements are provided; or when a semiconductor substrate such as Si or the like is used and MOS transistors are formed, and the semiconductor substrate is then polished, thinning and miniaturization of a semiconductor device can be achieved.

Note that the method of manufacturing a semiconductor device described in this embodiment mode can be applied to methods of manufacturing wireless power storage devices described in other embodiment modes in this specification.

Embodiment Mode 5

In this embodiment, uses of an RFID tag, which is an example of a usage mode of a semiconductor device which is capable of transmitting and receiving information wirelessly which was described in Embodiment Mode 3, will be described. An RFID tag can be included in, for example, bills, coins, securities, bearer bonds, documents (such as driver's licenses or resident's cards), packaging containers (such as wrapping paper or bottles), storage media (such as DVD software or video tapes), vehicles (such as bicycles), personal belongings (such as bags or glasses), foods, plants, animals, human bodies, clothing, everyday articles, products such as electronic appliances, identification tags on luggage, and the like. An RFID tag can be used as a so-called ID label, ID tag, or ID card. An electronic appliance refers to a liquid crystal display device, an EL display device, a television set (also called simply a television, a TV receiver, or a television receiver), a mobile phone, or the like. Below, applications of the invention and examples of products which include an application of the invention are described with reference to FIGS. 20A to 20E.

Figure 20A:
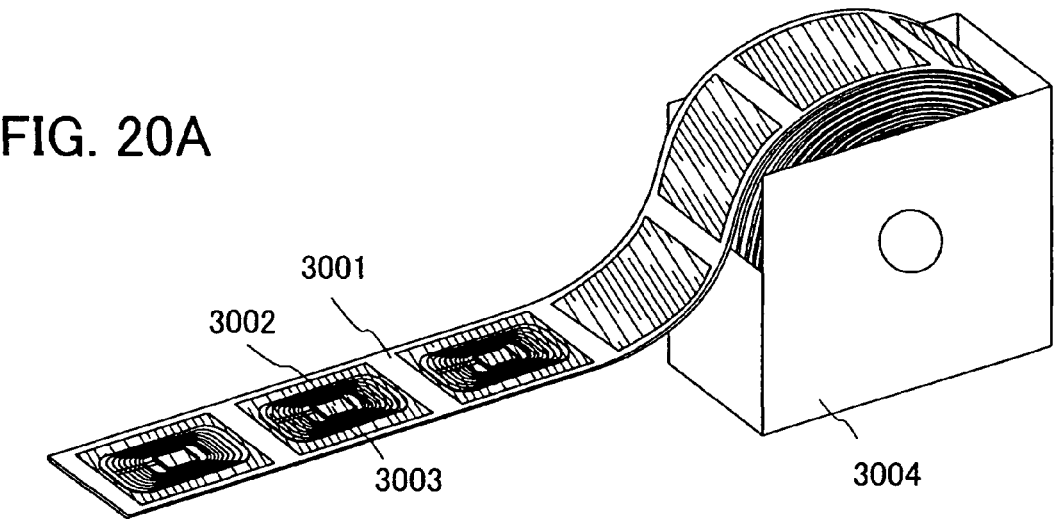
FIGS. 20A to 20E show examples of modes of usage of a wireless power storage device of the invention.

FIG. 20A shows examples of completed RFID tags relating to the invention. A plurality of ID labels 3003 each including an RFID tag 3002 are formed on a label board 3001 (separate paper). The ID labels 3003 are stored in a box 3004. Further, on the ID label 3003, there is information about a product or service (a product name, a brand, a trademark, a trademark owner, a seller, a manufacturer, or the like). Meanwhile, an ID number that is unique to the product (or the type of product) is assigned to the included RFID tag, so that forgery, infringement of intellectual property rights such as patent rights and trademark rights, and illegal behavior such as unfair competition can easily be detected. In addition, a large amount of information that cannot be clearly shown on a container of the product or the label (for example, production area, selling area, quality, raw materials, efficacy, use, quantity, shape, price, production method, method of use, time of production, time of use, expiration date, instructions for the product, information about the intellectual property of the product, or the like) can be input to the RFID tag so that a client or a consumer can access the information using a simple reader. Further, the RFID tag is structured such that the producer of a product can easily rewrite or erase, for example, the information, but a client or a consumer cannot. Note that a structure where the RFID tag has a display portion and can display the information may be employed.

Figure 20B:
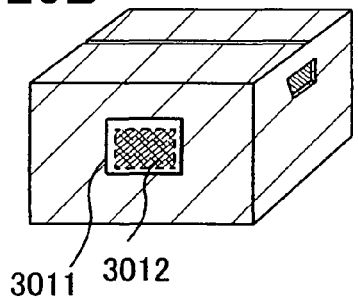

FIG. 20B shows a label-shaped RFID tag 3011 which includes an RFID tag 3012. By providing a product with the RFID tag 3011, management of the product can be simplified. For example, in a case where the product is stolen, the product can be traced, so the culprit can be identified quickly. Thus, by providing the RFID tag, products that are superior in so-called traceability can be distributed.

Figure 20C:
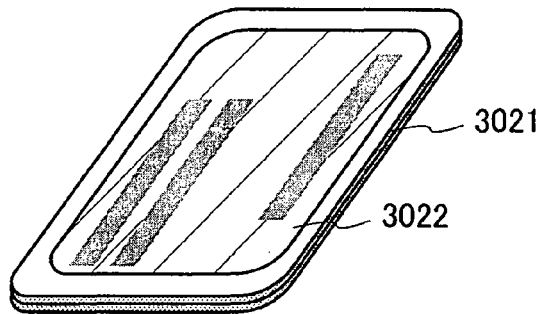

FIG. 20C shows an example of a completed ID card 3021 including an RFID tag 3022. The ID card 3021 may be any kind of card: a cash card, a credit card, a prepaid card, an electronic ticket, electronic money, a telephone card, a membership card, or the like. Further, a structure in which a display portion is provided on a surface of the ID card 3021 and various information is displayed may be employed.

Figure 20D:
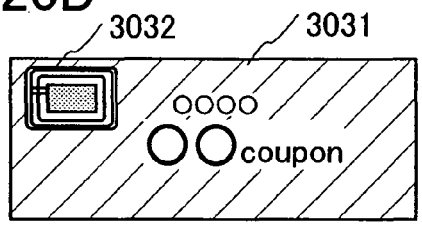

FIG. 20D shows a completed bearer bond 3031. An RFID tag 3032 is embedded in the bearer bond 3031 and is protected by a resin which forms the periphery of the RFID tag. Here, the resin is filled with a filler. The bearer bond 3031 can be formed in the same manner as an RFID tag of the invention. Note that the aforementioned bearer bond may be a stamp, a ticket, an admission ticket, a merchandise coupon, a book coupon, a stationery coupon, a beer coupon, a rice coupon, various types of gift coupon, various types of service coupon, or the like. Needless to say, the bearer bond is not limited thereto. Further, when the RFID tag 3032 of the invention is provided in bills, coins, securities, bearer bonds, documents, or the like, an authentication function can be provided, and by using the authentication function, forgery can be prevented.

Figure 20E:
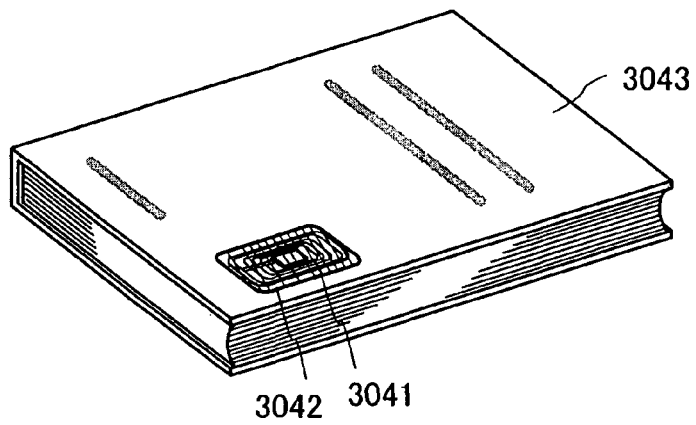

FIG. 20E shows a book 3043 to which an ID label 3041 which includes an RFID tag 3042 is attached. The RFID tag 3042 of the invention is firmly attached in or on goods by being attached to a surface or embedded, for example. As shown in FIG. 20E, the RFID tag 3042 can be embedded in the paper of a book, or embedded in an organic resin of a package. Because the RFID tag 3042 of the invention can be small, thin, and lightweight, it can be firmly attached to or in goods without spoiling their design.

Further, the efficiency of a system such as an inspection system can be improved by providing the RFID tag of the invention in, for example, packaging containers, storage media, personal belongings, foods, clothing, everyday articles, electronic appliances, or the like. Furthermore, by providing the RFID tag on or in a vehicle, counterfeit and theft can be prevented. Living things such as animals can be easily identified by implanting the individual living things with RFID tags. For example, year of birth, sex, breed, and the like can be easily discerned by implanting wireless tags in living things such as domestic animals.

Figure 21A:
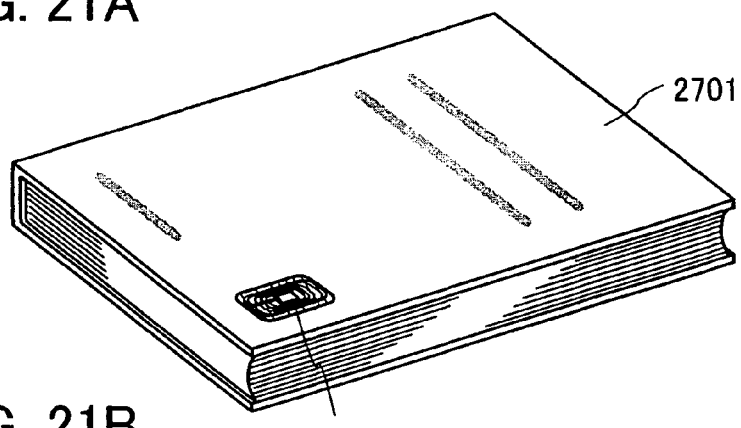
FIGS. 21A to 21D show examples of modes of usage of a wireless power storage device of the invention.
Figure 21B:
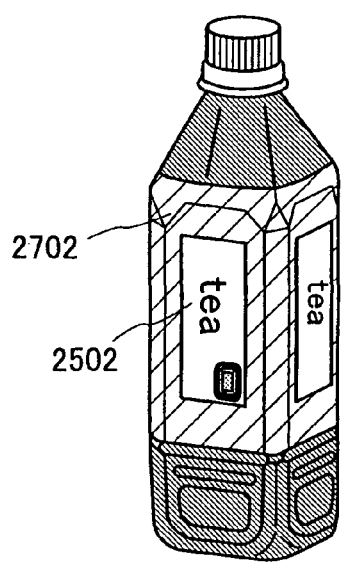

FIGS. 21A and 21B show a book 2701 and a plastic bottle 2702 to which ID labels 2502 which include an RFID tag of the invention are attached. Because the RFID tag that is used in the present invention is very thin, when the ID label is mounted on goods such as the book, function and design are not spoiled. Further, in the case of a non-contact type thin film integrated circuit device, an antenna and a chip can be formed over the same substrate and the non-contact type thin film integrated circuit device can be directly transferred to a product which has a curved surface easily.

Figure 21C:
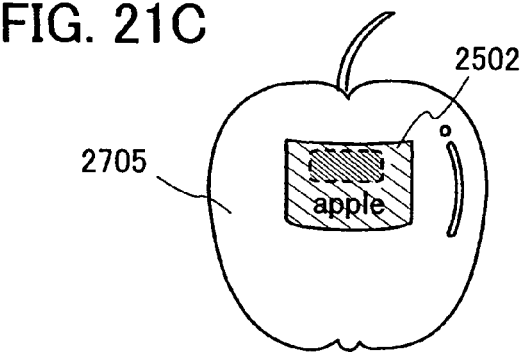
Figure 21D:
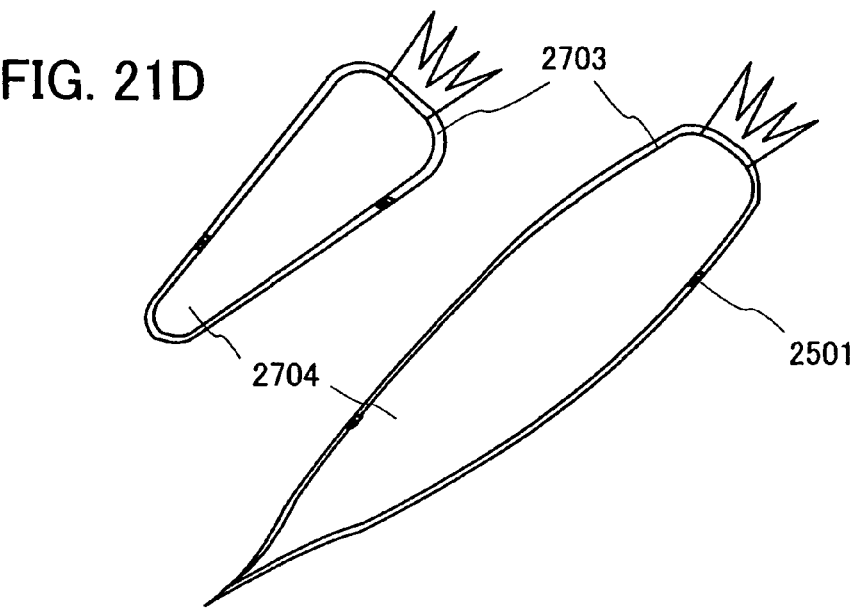

FIG. 21C shows the ID label 2502 which includes the RFID tag directly attached to fresh food, which is a piece of fruit 2705. Further, FIG. 21D shows examples of fresh food, vegetables 2704, wrapped in a wrapping film 2703. Note that in the case of attaching a chip 2501 to a product, it is possible that the chip 2501 might be taken off; however, in the case of wrapping the product with the packaging film 2703, it is difficult to take off the packaging film 2703. Therefore, to some extent, there is the advantage of a crime prevention measure. Note that the wireless power storage device of the invention can be applied to all kinds of products besides the above-mentioned products.

Further, a semiconductor device provided with a wireless power storage device of the invention can be provided with the sensor portion 190 as shown in FIG. 11 of Embodiment Mode 3, and can detect various information. Therefore, by having a person, an animal, or the like carry the semiconductor device mounted with the sensor portion with them, various information such as biological information and information on a state of health can be evaluated semipermanently, regardless of location. Below, specific examples of usage modes of a semiconductor device provided with a wireless power storage device will be described with reference to the drawings.

Figure 22A:
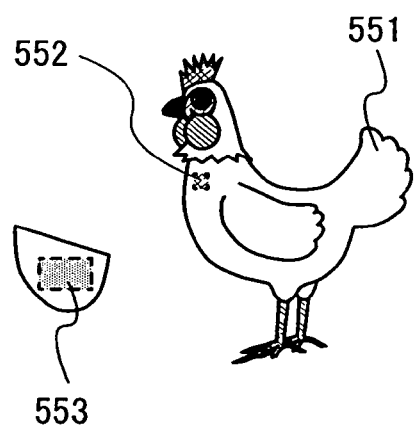
FIGS. 22A to 22D show examples of modes of usage of a wireless power storage device of the invention.

A semiconductor device 552 in which a sensor portion is provided with an element which detects temperature is embedded in an animal 551, and a feedbox or the like provided near the animal 551 is provided with a reader/writer 553 (FIG. 22A). Then, the sensor portion is operated intermittently and evaluated information is stored in the semiconductor device 552. Subsequently, by using the reader/writer 553 to periodically read information, such as information about body temperature, about the animal 551 which is detected by the semiconductor device 552, the state of health of the animal 551 can be monitored and managed. In this case, charging of a battery provided in the semiconductor device 552 may be performed using electromagnetic waves from the reader/writer 553.

Figure 22B:
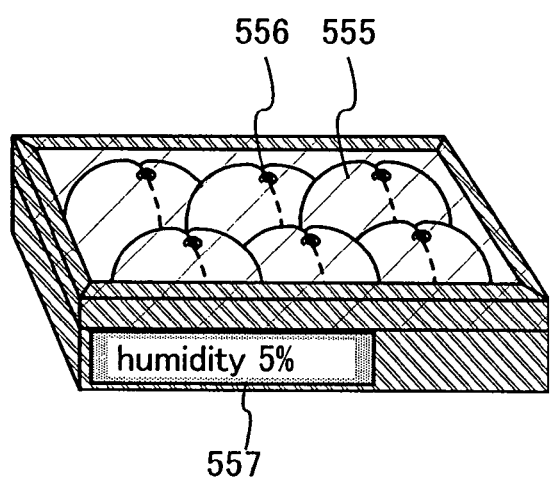

Further, foods 555 are provided with semiconductor devices 556 in which sensor portions include elements which detect gas components such as gas, and wrapping paper or a showcase is provided with a reader/writer 557 (FIG. 22B). Then, the sensor portion is operated intermittently and evaluated information is stored in the semiconductor device 556. Subsequently, by using the reader/writer 557 to periodically read information which is detected by the semiconductor device 556, the freshness of the foods 555 can be managed.

Figure 22C:
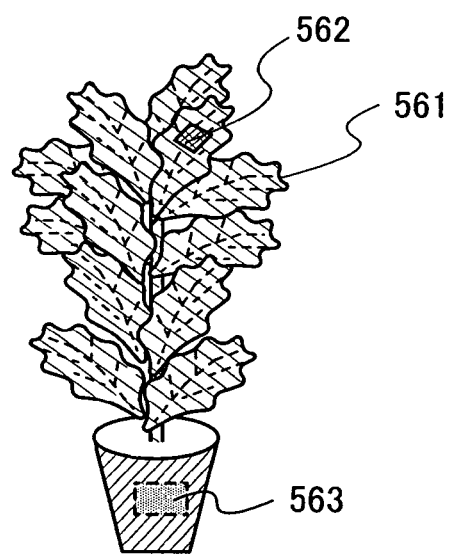

Further, a plant 561 is provided with a semiconductor device 562 in which a sensor portion includes an element which detects light, and a pot of the plant 561 or the like is provided with a reader/writer 563 (FIG. 22C). Then, the sensor portion is operated intermittently and evaluated information is stored in the semiconductor device 562. Subsequently, by using the reader/writer 563 to periodically read information which is detected by the semiconductor device 562, information about hours of sunshine can be obtained, and information on when the plant will bloom and be shipped can be predicted accurately. In particular, in the semiconductor device 562 which includes an element which detects light, when a solar cell is also provided, a battery provided in the semiconductor device 562 can be charged using light from outside as well as a power supply which employs electromagnetic waves from the reader/writer 563.

Figure 22D:
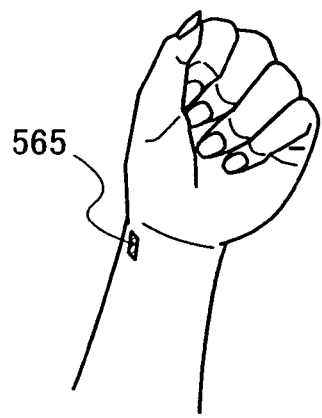

Further, an arm of a human body is provided with a semiconductor device 565 in which a sensor portion includes an element which detects pressure, by attaching or embedding the semiconductor device 565 (FIG. 22D). Then, the sensor portion is operated intermittently and evaluated information is stored in the semiconductor device 565. Subsequently, when a reader/writer is used to read information detected by the semiconductor device 565, information about blood pressure, pulse, and the like can be obtained.

A semiconductor device mounted with a wireless power storage device of the invention can be applied to all kinds of products besides the above-mentioned products. Note that in this embodiment mode, uses of an RFID tag which is an example of a usage mode of a semiconductor device were described; however, the invention is not limited to this. Wireless power storage devices described in previous embodiment modes can be included in the above-mentioned electronic devices. In such cases, as electrical power which operates the electronic device, electrical power obtained wirelessly from outside by the wireless power storage device can be used.

Embodiment Mode 6

In this embodiment mode, an example of a battery provided in a wireless power storage device of the invention will be described. In this embodiment mode, a battery which supplies electrical power to the load by discharging most, for example, 80 percent or more, of the electrical power charged to the battery, through discharging a certain predetermined number of times, preferably two times or less, is employed. That is, a battery is used in which the amount of electrical power discharged per unit time is greater, preferably twice as much or more, more preferably five times as much or more, than the amount of electrical power charged per unit time. The battery has a structure such that the battery is not discharged until the battery has been charged to 80 percent or more of its capacity.

When such a battery is employed, a large amount of electrical power can be supplied even when an electromagnetic wave used in charging the battery is weak. Further, when the battery has a capacity such that the electrical power necessary for the load to operate is discharged only a few times, the battery size can be reduced and the wireless power storage device can be made smaller and lighter.

Note that the battery structure described in this embodiment mode can be combined with structures of wireless power storage devices described in other embodiment modes in this specification.

The present application is based on Japanese priority application No. 2006-266513 filed on 29 Sep. 2006 with the Japanese Patent Office, the entire contents of which are hereby incorporated by reference.

What is claimed is:

1. A wireless power storage device comprising:
an antenna circuit;
a rectifier circuit;
a battery;
a charge control circuit configured to control charging of the battery;
a discharge control circuit configured to control discharging of the battery wherein the discharge control circuit comprises a switch; and
a load portion electrically connected to the battery through the discharge control circuit,
wherein the antenna circuit is electrically connected to the battery through the rectifier circuit and the charge control circuit,
wherein the battery is discharged by turning on the switch in response to a voltage of the battery and supplying electrical power stored in the battery to the load portion through the discharge control circuit,
wherein charging of the battery is performed cumulatively, wherein discharging of the battery is performed in pulse, and
wherein the battery is configured to discharge at least 80 percent of the electrical power stored in the battery by discharging two times or less.

2. The wireless storage device according to claim 1, wherein an amount of electrical power charged to the battery per unit time is less than an amount of electrical power discharged from the battery per unit time.

3. The wireless power storage device according to claim 2, wherein the amount of electrical power discharged from the battery per unit time is twice as much or more than the amount of electrical power charged to the battery per unit time.

4. The wireless power storage device according to claim 1, further comprising a second antenna circuit,
wherein the first antenna circuit receives an electromagnetic wave having a different frequency to an electromagnetic wave which is received by the second antenna circuit.

5. The wireless power storage device according to claim 1, further comprising a plurality of antennas, wherein the antennas receive electromagnetic waves with different frequencies.

6. The wireless power storage device according to claim 1, further comprising a sensor portion electrically connected to the power supply portion,
wherein the sensor portion is electrically connected to the battery through the discharge control circuit.

7. A wireless power storage device comprising:
an antenna circuit;
a rectifier circuit;
a battery;
a charge control circuit configured to control charging of the battery, the charge control circuit comprising a regulator;
a discharge control circuit configured to control discharging of the battery wherein the discharge control circuit comprises a switch; and
a load portion electrically connected to the battery through the discharge control circuit,
wherein the antenna circuit is electrically connected to the battery through the rectifier circuit and the charge control circuit,
wherein the battery is discharged by turning on the switch in response to a voltage of the battery and supplying electrical power stored in the battery to the load portion through the discharge control circuit, and
wherein a period of time that the battery is charged for is longer than a period of time that the battery is discharged for.

8. The wireless power storage device according to claim 7, wherein an amount of electrical power charged to the battery per unit time is less than an amount of electrical power discharged from the battery per unit time.

9. The wireless power storage device according to claim 8, wherein the amount of electrical power discharged from the battery per unit time is twice as much or more than the amount of electrical power charged to the battery per unit time.

10. The wireless power storage device according to claim 7, further comprising a second antenna circuit,
wherein the first antenna circuit receives an electromagnetic wave having a different frequency to an electromagnetic wave which is received by the second antenna circuit.

11. The wireless power storage device according to claim 7, further comprising a plurality of antennas, wherein the antennas receive electromagnetic waves with different frequencies.

12. The wireless power storage device according to claim 7, further comprising a sensor portion electrically connected to the power supply portion,
  wherein the sensor portion is electrically connected to the battery through the discharge control circuit.

13. A wireless power storage device comprising:
  an antenna circuit;
  a rectifier circuit;
  a battery;
  a charge control circuit configured to control charging of the battery;
  a discharge control circuit configured to control discharging of the battery wherein the discharge control circuit comprises a first switch;
  a switching circuit comprising a second switch; and
  a load portion electrically connected to the battery through the discharge control circuit and the switching circuit,
  wherein the antenna circuit is electrically connected to the battery through the rectifier circuit and the charge control circuit,
  wherein the battery is discharged by turning on the first switch in response to a voltage of the battery, turning on the second switch, and supplying electrical power stored in the battery to the load portion through the discharge control circuit and the switching circuit,
  wherein charging of the battery is performed cumulatively,
  wherein discharging of the battery is performed in pulse, and
  wherein the battery is configured to discharge at least 80 percent of the electrical power stored in the battery by discharging two times or less.

14. The wireless power storage device according to claim 13, wherein on and off of the second switch are controlled at a constant frequency.

15. The wireless power storage device according to claim 13, wherein an amount of electrical power charged to the battery per unit time is less than an amount of electrical power discharged from the battery per unit time.

16. The wireless power storage device according to claim 15, wherein the amount of electrical power discharged from the battery per unit time is twice as much or more than the amount of electrical power charged to the battery per unit time.

17. The wireless power storage device according to claim 13, further comprising a second antenna circuit,
  wherein the first antenna circuit receives an electromagnetic wave having a different frequency to an electromagnetic wave which is received by the second antenna circuit.

18. The wireless power storage device according to claim 13, further comprising a plurality of antennas, wherein the antennas receive electromagnetic waves with different frequencies.

19. The wireless power storage device according to claim 13, further comprising a sensor portion electrically connected to the power supply portion,
  wherein the sensor portion is electrically connected to the battery through the discharge control circuit.

20. A wireless power storage device comprising:
  an antenna circuit;
  a rectifier circuit;
  a battery;
  a charge control circuit configured to control charging of the battery, the charge control circuit comprising a regulator;
  a discharge control circuit configured to control discharging of the battery wherein the discharge control circuit comprises a first switch;
  a switching circuit comprising a second switch; and
  a load portion electrically connected to the battery through the discharge control circuit and the switching circuit,
  wherein the antenna circuit is electrically connected to the battery through the rectifier circuit and the charge control circuit,
  wherein the battery is discharged by turning on the first switch in response to a voltage of the battery, turning on the second switch, and supplying electrical power stored in the battery to the load portion through the discharge control circuit and the switching circuit, and
  wherein a period of time that the battery is charged for is longer than a period of time that the battery is discharged for.

21. The wireless power storage device according to claim 20, wherein on and off of the second switch are controlled at a constant frequency.

22. The wireless power storage device according to claim 20, wherein an amount of electrical power charged to the battery per unit time is less than an amount of electrical power discharged from the battery per unit time.

23. The wireless power storage device according to claim 22, wherein the amount of electrical power discharged from the battery per unit time is twice as much or more than the amount of electrical power charged to the battery per unit time.

24. The wireless power storage device according to claim 20, further comprising a second antenna circuit,
  wherein the first antenna circuit receives an electromagnetic wave having a different frequency to an electromagnetic wave which is received by the second antenna circuit.

25. The wireless power storage device according to claim 20, further comprising a plurality of antennas, wherein the antennas receive electromagnetic waves with different frequencies.

26. The wireless power storage device according to claim 20, further comprising a sensor portion electrically connected to the power supply portion,
  wherein the sensor portion is electrically connected to the battery through the discharge control circuit.

27. A semiconductor device comprising:
  a first antenna circuit;
  a second antenna circuit;
  a power supply portion electrically connected to the first antenna circuit wherein the power supply portion comprises:
    a rectifier circuit;
    a battery;
    a charge control circuit configured to control charging of the battery; and
    a discharge control circuit configured to control discharging of the battery wherein the discharge control circuit comprises a switch; and
  a signal processing circuit for wireless communication through the second antenna circuit wherein the signal processing circuit is electrically connected to the second antenna circuit,
  wherein the first antenna circuit is electrically connected to the battery through the rectifier circuit and the charge control circuit,
  wherein the battery is discharged by turning on the switch in response to a voltage of the battery and supplying electrical power stored in the battery to the signal processing circuit through the discharge control circuit, wherein charging of the battery is performed cumulatively, wherein discharging of the battery is performed in pulse, and wherein the battery is configured to discharge at least 80 percent of the electrical power stored in the battery by discharging two times or less.

28. The semiconductor device according to claim 27, wherein an amount of electrical power charged to the battery per unit time is less than an amount of electrical power discharged from the battery per unit time.

29. The semiconductor device according to claim 28, wherein the amount of electrical power discharged from the battery per unit time is twice as much or more than the amount of electrical power charged to the battery per unit time.

30. The semiconductor device according to claim 27,
wherein the first antenna circuit receives an electromagnetic wave having a different frequency to an electromagnetic wave which is received by the second antenna circuit.

31. The semiconductor device according to claim 27, further comprising a plurality of antennas, wherein the antennas receive electromagnetic waves with different frequencies.

32. The semiconductor device according to claim 27, further comprising a sensor portion electrically connected to the power supply portion and the signal processing circuit,
wherein the sensor portion is electrically connected to the battery through the discharge control circuit.

33. A semiconductor device comprising:
a first antenna circuit;
a second antenna circuit;
a power supply portion electrically connected to the first antenna circuit wherein the power supply portion comprises:
a rectifier circuit;
a battery;
a charge control circuit configured to control charging of the battery, the charge control circuit comprising a regulator; and
a discharge control circuit configured to control discharging of the battery wherein the discharge control circuit comprises a switch; and
a signal processing circuit for wireless communication through the second antenna circuit wherein the signal processing circuit is electrically connected to the second antenna circuit,
wherein the first antenna circuit is electrically connected to the battery through the rectifier circuit and the charge control circuit,
wherein the battery is discharged by turning on the switch in response to a voltage of the battery and supplying electrical power stored in the battery to the signal processing circuit through the discharge control circuit,
wherein charging of the battery is performed cumulatively, and wherein the battery is configured to discharge at least 80 percent of the electrical power stored in the battery by discharging two times or less.

34. The semiconductor device according to claim 33, wherein the first antenna circuit receives an electromagnetic wave having a different frequency to an electromagnetic wave which is received by the second antenna circuit.

35. The semiconductor device according to claim 33, wherein an amount of electrical power charged to the battery per unit time is less than an amount of electrical power discharged from the battery per unit time.

36. The semiconductor device according to claim 35, wherein the amount of electrical power discharged from the battery per unit time is twice as much or more than the amount of electrical power charged to the battery per unit time.

37. The semiconductor device according to claim 33, further comprising a plurality of antennas, wherein the antennas receive electromagnetic waves with different frequencies.

38. The semiconductor device according to claim 33, further comprising a sensor portion electrically connected to the power supply portion and the signal processing circuit,
wherein the sensor portion is electrically connected to the battery through the discharge control circuit.

39. A method for operating a wireless power storage device which comprises:
an antenna circuit;
a rectifier circuit;
a charge control circuit;
a battery;
a discharge control circuit comprising a switch; and
a load portion electrically connected to the battery through the discharge control circuit,
the method comprising:
receiving an electromagnetic wave by the antenna circuit;
charging the battery with electrical power of the electromagnetic wave through the rectifier circuit and the charge control circuit; and
discharging the battery by supplying electrical power stored in the battery to the load portion through the discharge control circuit,
wherein charging of the battery is performed cumulatively,
wherein discharging of the battery is performed in pulse,
wherein discharging of the battery is performed by turning on the switch in response to a voltage of the battery, and
wherein the battery is configured to discharge at least 80 percent of the electrical power stored in the battery by discharging two times or less.

40. The method for operating a wireless power storage device according to claim 39, wherein an amount of electrical power charged to the battery per unit time is less than an amount of electrical power discharged from the battery per unit time.

41. The method for operating a wireless power storage device according to claim 40, wherein the amount of electrical power discharged from the battery per unit time is twice as much or more than the amount of electrical power charged to the battery per unit time.

* * * * *